United States Patent
Naruse et al.

(10) Patent No.: US 9,536,289 B2
(45) Date of Patent: Jan. 3, 2017

(54) RESTORATION FILTER GENERATION DEVICE AND METHOD, IMAGE PROCESSING DEVICE, IMAGING DEVICE, AND NON-TRANSITORY COMPUTER-READABLE MEDIUM

(71) Applicant: FUJIFILM Corporation, Tokyo (JP)

(72) Inventors: Yousuke Naruse, Saitama (JP); Kenkichi Hayashi, Saitama (JP); Masahiko Sugimoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/837,521

(22) Filed: Aug. 27, 2015

(65) Prior Publication Data

US 2016/0027155 A1    Jan. 28, 2016

Related U.S. Application Data

(63) Continuation of application No. PCT/JP2013/080649, filed on Nov. 13, 2013.

(30) Foreign Application Priority Data

Mar. 4, 2013    (JP) ................................. 2013-042187

(51) Int. Cl.
*G06T 5/00*    (2006.01)
*H04N 1/58*    (2006.01)
(Continued)

(52) U.S. Cl.
CPC ................. *G06T 5/003* (2013.01); *G06T 5/20* (2013.01); *H04N 1/409* (2013.01); *H04N 1/58* (2013.01);
(Continued)

(58) Field of Classification Search
None
See application file for complete search history.

(56) References Cited

U.S. PATENT DOCUMENTS 8,477,206 B2 *    7/2013    Hatakeyama ........... G06T 5/006
                                                        348/222.1
2009/0238455 A1    9/2009    Kasahara
(Continued)

FOREIGN PATENT DOCUMENTS

JP    2009-225286 A    10/2009
JP    2010-140442 A    6/2010
(Continued)

OTHER PUBLICATIONS

International Search Report issued in PCT/JP2013/080649, mailed on Dec. 24, 2013.
Written Opinion issued in PCT/JP2013/080649, mailed on Dec. 24, 2013.

*Primary Examiner* — Bernard Krasnic
(74) *Attorney, Agent, or Firm* — Birch, Stewart, Kolasch & Birch, LLP

(57) ABSTRACT

A restoration filter generation device that generates a restoration filter for a restoration process on the basis of a point spread in an optical system, the restoration process being performed on luminance system image data as image data concerning a luminance which is generated on the basis of image data for each color of plural colors acquired by an image pickup device having the optical system, the restoration filter generation device includes a first transfer function acquisition device, a correction information acquisition device, a second transfer function acquisition device, a third transfer function calculation device, and a restoration filter generation device that generates the restoration filter for the restoration process on the basis of the third transfer function calculated by the third transfer function calculation device.

17 Claims, 14 Drawing Sheets

(51) Int. Cl.
 *H04N 1/409* (2006.01)
 *G06T 5/20* (2006.01)
 *H04N 1/60* (2006.01)
 *H04N 9/04* (2006.01)

(52) U.S. Cl.
 CPC ............ H04N 1/6027 (2013.01); H04N 9/045 (2013.01); *G06T 2207/10024* (2013.01); *G06T 2207/20008* (2013.01); *G06T 2207/20024* (2013.01); *G06T 2207/20056* (2013.01)

(56) References Cited

U.S. PATENT DOCUMENTS

| | | | |
|---|---|---|---|
| 2010/0079626 A1* | 4/2010 | Hatakeyama | G06T 5/006 348/241 |
| 2011/0135213 A1 | 6/2011 | Hatakeyama | |
| 2011/0199514 A1 | 8/2011 | Tamura | |
| 2012/0069237 A1 | 3/2012 | Kishine | |
| 2012/0154626 A1 | 6/2012 | Hatakeyama et al. | |
| 2013/0038749 A1* | 2/2013 | Hatakeyama | G06T 5/003 348/222.1 |

FOREIGN PATENT DOCUMENTS

| | | |
|---|---|---|
| JP | 2011-124692 A | 6/2011 |
| JP | 2012-065187 A | 3/2012 |
| JP | 2012-129932 A | 7/2012 |

* cited by examiner

TANGENTIAL DIRECTION

RESTORATION FILTER GENERATION DEVICE AND METHOD, IMAGE PROCESSING DEVICE, IMAGING DEVICE, AND NON-TRANSITORY COMPUTER-READABLE MEDIUM

CROSS-REFERENCE TO RELATED APPLICATIONS

This application is a Continuation of PCT International Application No. PCT/JP2013/080649 filed on Nov. 13, 2013, which claims priority under 35 U.S.C §119(a) to Japanese Patent Application No. 2013-042187 filed on Mar. 4, 2013. Each of the above application(s) is hereby expressly incorporated by reference, in its entirety, into the present application.

BACKGROUND OF THE INVENTION

Field of the Invention

The present invention relates to a restoration filter generation device and method, an image processing device, an imaging device, a restoration filter generation program, and a non-transitory computer-readable medium, and particularly relates to a technology of generating a restoration filter for performing a restoration process on an image captured via an optical system on the basis of a point spread function (PSF) or optical transfer function (OTF) of the optical system.

Description of the Related Art

The restoration process on the image captured is a process in which characteristics of degradation (PSF/OTF) caused by aberration and the like of the optical system (imaging lens) are founded in advance and a captured image (image having degradation) is subjected to a restoration process by use of a restoration filter generated on the basis of the PSF/OTF so as to restore to a high resolution image.

The PSF and the OTF are in relation of the Fourier transform, and the PSF is a function of a real variable and the OTF is a function of a complex variable. Examples of those having information equivalent to these include a modulation transfer function or amplitude transfer function (MTF) and a phase transfer function (PTF), each of which represents an amplitude component and phase component of the OTF. Combination of the MTF and the PTF has an amount of the information equivalent to the OTF or the PSF.

The restoration process using the restoration filter generated on the basis of the PSF/OTF may be classified roughly into a "frequency restoration" and a "phase restoration". The "frequency restoration" is for equalizing MTF characteristics degraded by the optical system, and the "phase restoration" is for moving an image with frequency dependence such that an asymmetry PSF shape is restored to points as much as possible.

Since the aberration of the optical system varies depending on wavelength, it is ideally desirable to use a restoration filter different for each of color images of red (R), green (G) and blue (B). However, because of a large arithmetic load in the processes for the respective colors, it has been considered that only a luminance component having a large visual effect is to be subjected the restoration process.

Since the PSF shape with respect to the luminance cannot be defined, some criteria need to be considered in order to find a tradeoff such that a restoration performance is not adversely affected.

As a solution to this problem, Japanese Patent Application Laid-Open No. 2010-140442 (hereinafter referred to as PTL 1) discloses a method for finding the PSF with respect to a luminance component image in which a transformation formula for a luminance is used as it is to mix the PSFs for the respective colors of RGB.

In a case of performing the restoration process on the luminance, correction corresponding to magnification chromatic aberration correction cannot be performed, and thus the magnification chromatic aberration correction needs to be separately performed.

Japanese Patent Application Laid-Open No. 2012-129932 (hereinafter referred to as PTL 2) describes a technology in which the restoration process and the magnification chromatic aberration correction are separately performed.

In the image processing method described in PTL 2, a restoration filter is generated on the basis of a point spread function of which a difference between color components of the point spread function is reduced by way of a relative parallel translation, or a restoration filter is generated from an optical transfer function whose linear component corresponding to the magnification chromatic aberration is removed. In other words, a restoration filter is generated which performs only the "frequency restoration", but does not perform the "phase restoration". Then, an input image is subjected to the restoration process by use of the generated restoration filter, and thereafter, a color shift corresponding to the magnification chromatic aberration of the image after the restoration process is detected and a correction (magnification chromatic aberration correction) is performed to reduce the detected color shift.

As another embodiment, the magnification chromatic aberration correction is performed on an input image by use of a color shift correction amount depending on the magnification chromatic aberration of design of the optical system, and subsequently, the restoration process is performed by use of the restoration filter performing only the "frequency restoration". However, since the color shift possibly remains due to an image degrading factor such as variations in manufacturing or variations in light source spectra of the optical system even if the restoration process is performed by use of the above magnification chromatic aberration correction and restoration filter, the color shift of the image after the restoration process is detected and the magnification chromatic aberration correction is performed to reduce the detected color shift.

SUMMARY OF THE INVENTION

In the invention described in PTL 1, the PSF with respect to the luminance component image is found and the restoration process is performed on only the luminance component image by use of the restoration filter generated on the basis of the found PSF, but this restoration process cannot disadvantageously perform the correction corresponding to the magnification chromatic aberration correction.

On the other hand, in the invention described in PTL 2, the restoration process is performed by use of the restoration filter performing only the "frequency restoration" to obtain a restored image sharpened in the respective color components, and then, the color shift corresponding to the magnification chromatic aberration of the restored image for each color component is detected to perform the magnification chromatic aberration correction for reducing the detected color shift. For this reason, the restoration process by use of the restoration filter needs to be performed for each color component, which disadvantageously increases the arithmetic load. The invention described in PTL 2 is characterized in that the phase restoration by the restoration process is not performed, but the restoration process is first performed with taking into account that the color shift amount is varied because a sharpness at an edge portion is varied for each color component due to the restoration process, and thereafter, the color shift of the restored image is detected and the magnification chromatic aberration correction is performed for reducing the detected color shift. Therefore, the magnification chromatic aberration correction for reducing the detected color shift needs to be performed after the restoration process. Further, a detection process also needs to be performed for detecting the color shift from the restored image.

The present invention has been made in consideration of such a circumstance, and has an object to provide a restoration filter generation device and method capable of generating a restoration filter in which an arithmetic load can be reduced in a restoration process on an image whose magnification chromatic aberration is corrected, and particularly, a proper restoration process can be performed regardless of a correction residual amount of the magnification chromatic aberration correction, an image processing device, and an imaging device, a restoration filter generation program, and a non-transitory computer-readable medium.

In order to achieve the above object, a restoration filter generation device according to an aspect of the invention is a restoration filter generation device that generates a restoration filter for a restoration process on the basis of a point spread in an optical system, the restoration process being performed on luminance system image data as image data concerning a luminance which is generated on the basis of image data for each color of plural colors acquired by an image pickup device having the optical system, the restoration filter generation device including a first transfer function acquisition device that acquires a first transfer function regarding the point spread in the optical system for each color of the plural colors, a correction information acquisition device that, in a case where magnification chromatic aberration caused by the optical system is corrected by scaling up or down the image data for each color of the plural colors, acquires correction information indicating a correction amount or a correction residual amount of the magnification chromatic aberration, for each color of the plural colors, a second transfer function acquisition device that acquires a second transfer function obtained by parallelly translating the first transfer function for each color of the plural colors so as to offset the correction residual amount on the basis of the correction information acquired by the correction information acquisition device, third transfer function calculation device that calculates a third transfer function with respect to the luminance system image data on the basis of the second transfer function for each color of the plural colors acquired by the second transfer function acquisition device, and a restoration filter generation device that generates the restoration filter for the restoration process on the basis of the third transfer function calculated by the third transfer function calculation device.

According to an aspect of the invention, since the restoration filter is generated for the restoration process performed on the luminance system image data which is generated on the basis of the image data for each color of the plural colors having been subjected to magnification chromatic aberration correction, an arithmetic load in the restoration process can be reduced and the number of the generated restoration filters can be reduced as compared with a case where the restoration process is performed on the image data for each color. Moreover, since the magnification chromatic aberration correction cannot carry out scaling up and down for any coordinate transformation owing to limitation of mounting, the chromatic aberration cannot be perfectly corrected in some cases. Therefore, in generating the restoration filter with respect to the luminance system image data, the correction residual amount of the magnification chromatic aberration correction is taken into account and the first transfer function for each color of the plural colors is parallelly translated to offset the correction residual amount, and then the second transfer function for each color of the plural colors is found. Then, the third transfer function with respect to the luminance system image data is calculated on the basis of the second transfer function for each color, and the restoration filter is generated on the basis of the third transfer function (that is, the restoration filter is generated taking into account MTF variation of the luminance in the tangential direction on the basis of the correction residual amount), which makes it possible to generate the restoration filter adequate with respect to the luminance system image data. The restoration filter generated in this way can carry out a good restoration process on the luminance system image data which is generated from the image data for each color having the correction residual amount of the magnification chromatic aberration correction.

In the restoration filter generation device according to another aspect of the invention, it is preferable that the third transfer function calculation device mixes the second transfer functions for respective colors of the plural colors to calculate the third transfer function with respect to the luminance system image data.

In the restoration filter generation device according to still another aspect of the invention, it is preferable that the third transfer function calculation device calculates a linear sum of values obtained by multiplying the second transfer functions for respective colors of the plural colors by weighting coefficients for respective colors as the third transfer function with respect to the luminance system image data. A linear sum using a weighting coefficient similar to luminance transform is preferable as the weighted linear sum in calculating the third transfer function.

The restoration filter generation device according to still another aspect of the invention may further include a correction accuracy evaluation device that evaluates whether or not correction accuracy of the magnification chromatic aberration is equal to or less than a threshold, wherein in a case where the correction accuracy evaluation device evaluates that the correction accuracy of the magnification chromatic aberration is equal to or less than the threshold, the restoration filter generation device removes phase information from the third transfer function calculated by the third transfer function calculation device to generate the restoration filter for performing only frequency restoration on the basis of the third transfer function from which the phase information is removed. Particularly, in a case where the correction residual amount of the magnification chromatic aberration correction is not accurately found or the correction accuracy is low (in a case where the correction accuracy of the magnification chromatic aberration is evaluated to be equal to or less than the threshold), the phase information included in the third transfer function is not accurate. Therefore, it is preferable that the phase information is removed from the third transfer function to generate the restoration filter for performing only the frequency restoration on the basis of the third transfer function from which the phase information is removed.

The restoration filter generation device according to still another aspect of the invention may further include a fourth transfer function calculation device that removes the phase information respectively from the first transfer functions for respective colors of the plural colors acquired by the first transfer function acquisition device and mixes the first transfer functions for respective colors of the plural colors from each of which the phase information is removed to calculate a fourth transfer function with respect to the luminance system image data, and a correction accuracy evaluation device that evaluates whether or not correction accuracy of the magnification chromatic aberration is equal to or less than a threshold, wherein in a case where the correction accuracy evaluation device evaluates that the correction accuracy of the magnification chromatic aberration is equal to or less than the threshold, the restoration filter generation device generates the restoration filter for performing only frequency restoration with respect to the luminance system image data on the basis of the fourth transfer function calculated by the fourth transfer function calculation device. In the case where the correction residual amount of the magnification chromatic aberration correction is not accurately found or the correction accuracy is low as described above, the phase information included in the third transfer function is not accurate. Therefore, the phase information is removed respectively from the first transfer functions for respective colors of the plural colors to mix the first transfer functions for respective colors of the plural colors from each of which the phase information is removed for calculating the fourth transfer function, and the restoration filter is generated for performing only the frequency restoration with respect to luminance system image data on the basis of the calculated fourth transfer function. The restoration filter obtained by removing the phase information from the third transfer function and being generated on the basis of the third transfer function from which the phase information is removed is preferred rather than the restoration filter obtained by removing the phase information respectively from the first transfer functions for respective colors of the plural colors and being generated on the basis of the fourth transfer function obtained by mixing the first transfer functions for respective colors of the plural colors from each of which the phase information is removed. This is because, for the former restoration filter, positional shift correlation between colors is taken into account in calculating the third transfer function.

In the restoration filter generation device according to still another aspect of the invention, the fourth transfer function calculation device calculates a square root of a sum of squares of values obtained by multiplying the first transfer functions for respective colors of the plural colors from each of which the phase information is removed by weighting coefficients for respective colors as the fourth transfer function with respect to the luminance system image data.

In the restoration filter generation device according to still another aspect of the invention, the fourth transfer function calculation device calculates a linear sum of values obtained by multiplying the first transfer functions for respective colors of the plural colors from each of which the phase information is removed by weighting coefficients for respective colors as the fourth transfer function with respect to the luminance system image data.

In the restoration filter generation device according to still another aspect of the invention, the first transfer function acquisition device may acquire the first transfer function for each color of the plural colors for the optical system which has a lens section for modulating a phase to extend a depth of field. The invention can be also applied to a case where the optical system is one having the lens section for modulating the phase to extend the depth of field (EDoF (extended depth of field (focus) optical system lens).

The restoration filter generation device according to still another aspect of the invention further includes a switching device that switches over between a case where the magnification chromatic aberration correction is performed and a case where the magnification chromatic aberration correction is not performed, and a fifth transfer function calculation device that mixes the first transfer functions for respective colors of the plural colors to calculate a fifth transfer function with respect to the luminance system image data when the switching device switches over to the case where the magnification chromatic aberration correction is not performed, wherein the restoration filter generation device generates the restoration filter with respect to the luminance system image data on the basis of the fifth transfer function calculated by the fifth transfer function calculation device when the switching device switches over to the case where the magnification chromatic aberration correction is not performed.

In a case where the magnification chromatic aberration correction is not intentionally performed, the first transfer functions for respective colors with the magnification chromatic aberration correction being not taken into account (the first transfer functions containing the phase information) are mixed to calculate the fifth transfer function with respect to the luminance system image data, and the restoration filter with respect to the luminance system image data is generated on the basis of this fifth transfer function. This makes it possible to generate the restoration filter capable of correcting, through the restoration process on the luminance system image data, MTF degradation in the luminance system image data caused by that the magnification chromatic aberration correction is not performed. According to this generated restoration filter, the frequency restoration and the phase restoration can be performed on the luminance system image data, but the correction corresponding to the magnification chromatic aberration correction is not performed.

It is preferable that the restoration filter generation device according to still another aspect of the invention further includes a switching device that switches over between a case where the magnification chromatic aberration correction is performed and a case where the magnification chromatic aberration correction is not performed, wherein the image data of the plural colors includes image data of each color of red (R), green (G), and blue (B), and the restoration filter generation device generates the restoration filter with respect to the luminance system image data on the basis of the first transfer function corresponding to the G color of the first transfer functions for respective colors of the plural colors which are acquired by the first transfer function acquisition device, when the switching device switches over to the case where the magnification chromatic aberration correction is not performed.

In a case where the magnification chromatic aberration correction is not intentionally performed, if a degree of the MTF degradation in the tangential direction is small and a degraded MTF value is larger than a threshold defined from an S/N ratio (signal-to-noise ratio), the frequency is emphasized in the tangential direction to make the chromatic aberration distinct in some cases. In such a case, it is preferable to generate the restoration filter with respect to the luminance system image data on the basis of the first transfer function corresponding to monochromatic G color image data contributing the most to generation of the luminance system image data.

An image processing device according to still another aspect of the invention includes an image data acquisition device that acquires image data for each color of plural colors acquired by an image pickup device having an optical system, a magnification chromatic aberration correction device that corrects magnification chromatic aberration for each color caused by the optical system by scaling up or down the image data for each color of the plural colors acquired by the image data acquisition device, an image data generation device that generates luminance system image data as image data concerning a luminance on the basis of the image data for each color of the plural colors subjected to the magnification chromatic aberration correction by the magnification chromatic aberration correction device, a restoration filter storage device that stores therein a restoration filter generated by any restoration filter generation device described above, and a restoration process device that performs a restoration process on the luminance system image data generated by the image data generation device by use of the restoration filter stored in the restoration filter storage device. Since the restoration process is performed on the luminance system image data generated by the image data generation device by use of the restoration filter stored in the restoration filter storage device, the arithmetic load in the restoration process can be reduced as compared with a case where the image data for each color is individually restored, and since the restoration process is performed by use of the restoration filter generated taking into account the correction residual amount by the magnification chromatic aberration correction device, frequency emphasis in the tangential direction caused by the correction residual amount can be reduced.

An image processing device according to still another aspect of the invention includes an image data acquisition device that acquires image data for each color of plural colors acquired by an image pickup device having an optical system, a switching device that switches over between a case where the magnification chromatic aberration correction is performed and a case where the magnification chromatic aberration correction is not performed, a magnification chromatic aberration correction device that corrects magnification chromatic aberration for each color caused by the optical system by scaling up or down the image data for each color of the plural colors acquired by the image data acquisition device, when the switching device switches over to the case where the magnification chromatic aberration correction is performed, an image data generation device that generates luminance system image data as image data concerning a luminance on the basis of the image data for each color of the plural colors subjected to the magnification chromatic aberration correction by the magnification chromatic aberration correction device, when the switching device switches over to the case where the magnification chromatic aberration correction is performed, and generates luminance system image data as image data concerning a luminance on the basis of the image data for each color of the plural colors acquired by the image data acquisition device, when the switching device switches over to the case where the magnification chromatic aberration correction is not performed, a restoration filter storage device that stores therein a restoration filter generated by any restoration filter generation device described above, and a restoration process device that performs a restoration process on the luminance system image data generated by the image data generation device by use of the restoration filter stored in the restoration filter storage device. This makes it possible to perform the restoration process by use of the restoration filter which is generated depending on the case where the magnification chromatic aberration correction is performed or the case where the magnification chromatic aberration correction is not performed, with respect to the luminance system image data generated on the basis of the image data for each color of the plural colors subjected to the magnification chromatic aberration correction or the luminance system image data generated on the basis of the image data for each color of the plural colors not subjected to the magnification chromatic aberration correction.

An image processing device according to still another aspect of the invention includes an image data acquisition device that acquires image data for each color of plural colors acquired by an image pickup device having an optical system, a magnification chromatic aberration correction device that corrects magnification chromatic aberration for each color caused by the optical system by scaling up or down the image data for each color of the plural colors acquired by the image data acquisition device, an image data generation device that generates luminance system image data as image data concerning a luminance on the basis of the image data for each color of the plural colors subjected to the magnification chromatic aberration correction by the magnification chromatic aberration correction device, any restoration filter generation device described above, and a restoration process device that performs a restoration process on the luminance system image data generated by the image data generation device by use of the restoration filter generated by the restoration filter generation device. This image processing device differs from the above image processing device including the restoration filter storage device in that the restoration filter generation device is included.

An image processing device according to still another aspect of the invention includes an image data acquisition device that acquires image data for each color of plural colors acquired by an image pickup device having an optical system, a switching device that switches over between a case where the magnification chromatic aberration correction is performed and a case where the magnification chromatic aberration correction is not performed, a magnification chromatic aberration correction device that corrects magnification chromatic aberration for each color caused by the optical system by scaling up or down the image data for each color of the plural colors acquired by the image data acquisition device, when the switching device switches over to the case where the magnification chromatic aberration correction is performed, an image data generation device that generates luminance system image data as image data concerning a luminance on the basis of the image data for each color of the plural colors subjected to the magnification chromatic aberration correction by the magnification chromatic aberration correction device, when the switching device switches over to the case where the magnification chromatic aberration correction is performed, and generates luminance system image data as image data concerning a luminance on the basis of the image data for each color of the plural colors acquired by the image data acquisition device, when the switching device switches over to the case where the magnification chromatic aberration correction is not performed, any restoration filter generation device described above, and a restoration process device that performs a restoration process on the luminance system image data generated by the image data generation device by use of the restoration filter generated by the restoration filter generation device.

An imaging device according to still another aspect of the invention includes an image pickup device that has an optical system and outputs image data for each color of plural colors, and the above image processing device.

A restoration filter generation method according to still another aspect of the invention is a restoration filter generation method for generating a restoration filter for a restoration process on the basis of a point spread in an optical system, the restoration process being performed on luminance system image data as image data concerning a luminance which is generated on the basis of image data for each color of plural colors acquired by an image pickup device having the optical system, the method including a first transfer function acquisition step of acquiring a first transfer function regarding the point spread in the optical system for each color of the plural colors, a correction information acquisition step of, in a case where magnification chromatic aberration caused by the optical system is corrected by scaling up or down the image data for each color of the plural colors, acquiring correction information indicating a correction amount or a correction residual amount of the magnification chromatic aberration, for each color of the plural colors, a second transfer function acquisition step of acquiring a second transfer function obtained by parallelly translating the first transfer function for each color of the plural colors so as to offset the correction residual amount on the basis of the correction information acquired in the correction information acquisition step, a third transfer function calculation step of calculating a third transfer function with respect to the luminance system image data on the basis of the second transfer function for each color of the plural colors acquired in the second transfer function acquisition step, and a restoration filter generation step of generating the restoration filter for the restoration process on the basis of the third transfer function calculated in the third transfer function calculation step.

A non-transitory computer-readable medium recording a program according to still another aspect of the invention is a non-transitory computer-readable medium recording a program that generates a restoration filter for a restoration process, the restoration process being performed on luminance system image data as image data concerning a luminance which is generated on the basis of image data for each color of plural colors acquired by an image pickup device having an optical system, the program causing a computer to attain a first transfer function acquisition function to acquire a first transfer function regarding the point spread in the optical system for each color of the plural colors, a correction information acquisition function to, in a case where magnification chromatic aberration caused by the optical system is corrected by scaling up or down the image data for each color of the plural colors, acquire correction information indicating a correction amount or a correction residual amount of the magnification chromatic aberration, for each color of the plural colors, a second transfer function acquisition function to acquire a second transfer function obtained by parallelly translating the first transfer function for each color of the plural colors so as to offset the correction residual amount on the basis of the correction information acquired by the correction information acquisition function, a third transfer function calculation function to calculate a third transfer function with respect to the luminance system image data on the basis of the second transfer function for each color of the plural colors acquired by the second transfer function acquisition function, and a restoration filter generation function to generate the restoration filter for the restoration process on the basis of the third transfer function calculated by the third transfer function calculation function.

According to the present invention, the restoration filter is generated for the restoration process performed only on the luminance system image data having a large visual effect that is the image data whose magnification chromatic aberration is corrected, reducing the arithmetic load in the restoration process. Particularly, the correction residual amount of the magnification chromatic aberration correction is taken into account to generate the restoration filter with respect to the luminance system image data, which enables the proper restoration process to be performed on the luminance system image data.

DETAILED DESCRIPTION OF THE PREFERRED EMBODIMENTS

Hereinafter, a description is given of preferable embodiments of a restoration filter generation device and method, an image processing device, an imaging device, a restoration filter generation program, and non-transitory computer-readable medium according to the invention with reference to the drawings.

First Embodiment

Configuration of Digital Camera

Figure 1:
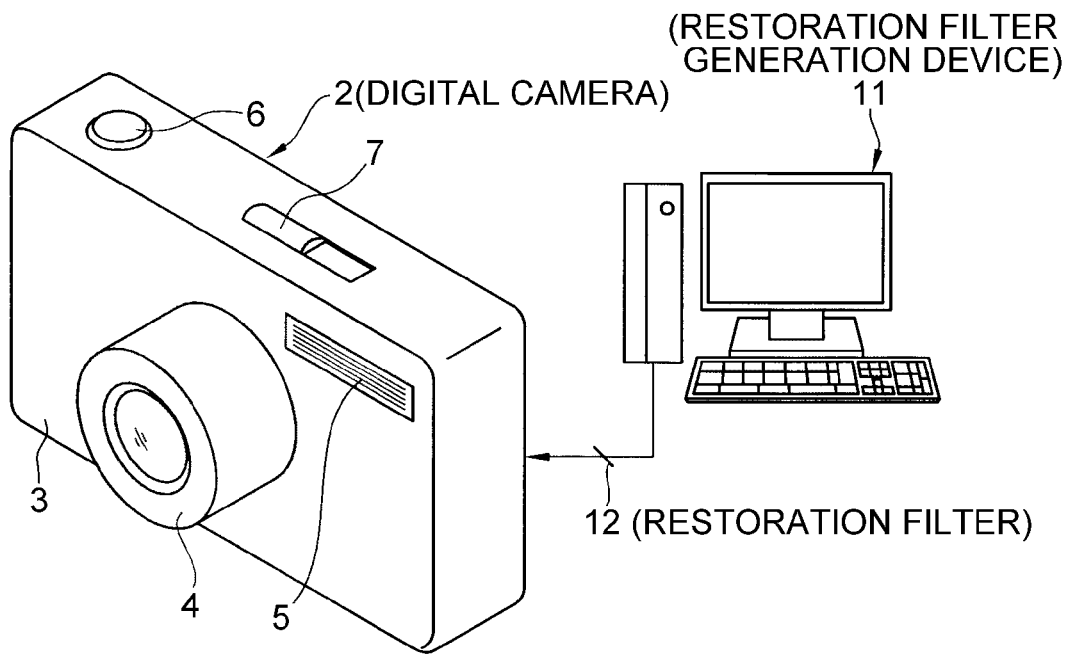
FIG. 1 is an illustration of a restoration filter generation device and a digital camera which acquires a restoration filter from the restoration filter generation device to perform a restoration process.
Figure 2:
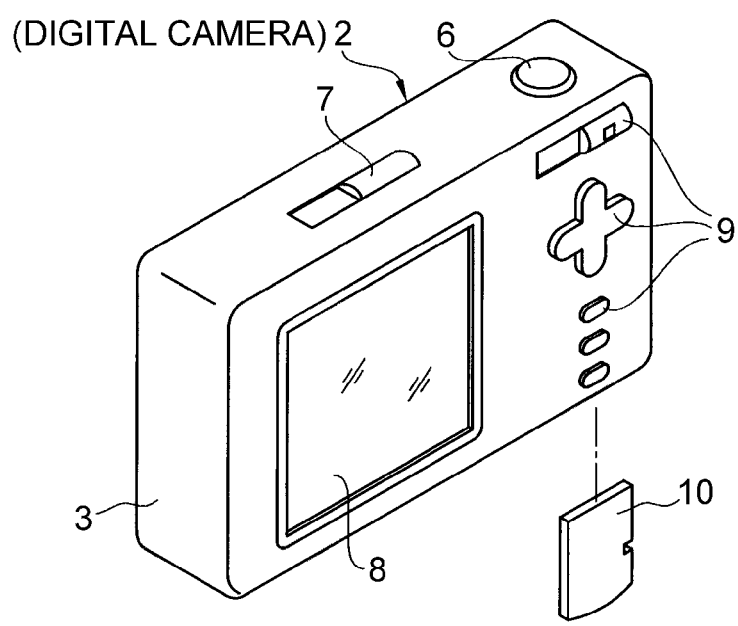
FIG. 2 is a back side perspective view of the digital camera.

In FIG. 1 and FIG. 2, a digital camera 2 corresponds to an imaging device according to the invention. The digital camera 2 has a lens barrel 4 including an optical system or the like, and a stroboscopic light emitting part 5 provided on a front side of a camera main body 3. The camera main body 3 has a shutter button 6, power switch 7 and the like provided on a top side thereof.

The camera main body 3 is provided with a display unit 8, operation unit 9 and the like on a back side thereof. The display unit 8 serves as an electronic viewfinder in an imaging standby state to display a live view image (also referred to as through image). In reproducing an image, an image is reproduced and displayed on the display unit 8 on the basis of image data recorded in a memory card 10.

The operation unit 9 includes a mode selector switch, cross-shaped key, execution key and the like. The mode selector switch is operated when operation modes of the digital camera 2 are switched. The digital camera 2 has an imaging mode for capturing an image of a subject to obtain an imaged image data, a review mode for reproducing and displaying on the basis of the imaged image data, and the like.

The cross-shaped key and the execution key are operated in displaying various menu screens and setting screens on the display unit 8, in moving a cursor displayed in these menu screens and setting screens, in fixing various setting items for the digital camera 2, and the like.

The camera main body 3 has a card slot into which the memory card 10 is loaded and a loading lid to open and close an opening of the card slot provided on a bottom side thereof, which are omitted in the figure. The memory card 10 records the imaged image data obtained by capturing an image of a subject as an image file in various file formats.

The digital camera 2 having the above configuration uses a restoration filter 12 acquired from a restoration filter generation device 11 to perform the restoration process in order to reduce image degradation caused by various aberrations of the optical system. Acquisition of the restoration filter 12 by the digital camera 2 is carried out by a camera manufacturer.

Figure 3:
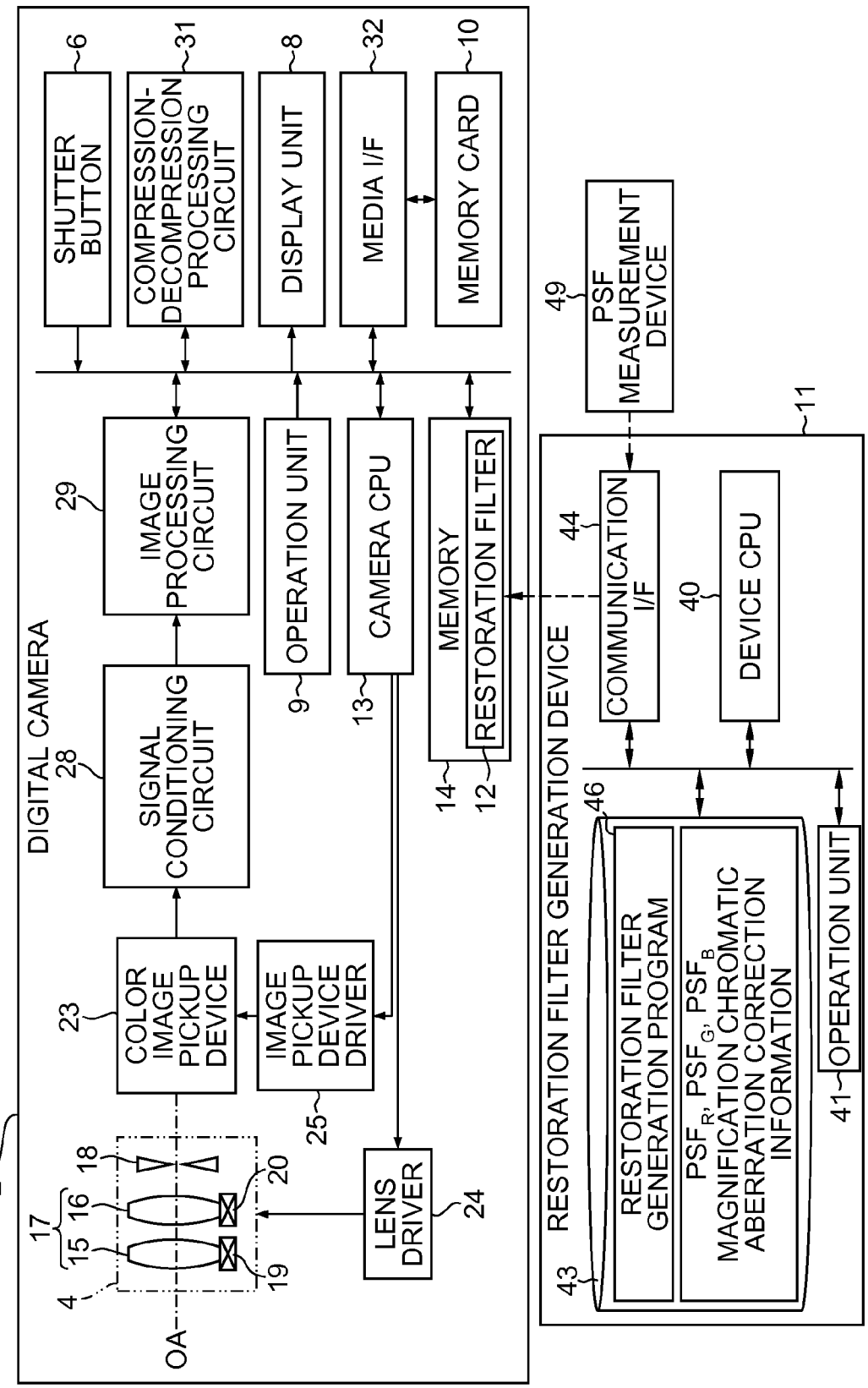
FIG. 3 is a block diagram showing an electrical configuration of the digital camera and restoration filter generation device.

FIG. 3 is a block diagram showing an electrical configuration of the digital camera 2 and restoration filter generation device 11. As shown in FIG. 3, a camera CPU (central processing unit) 13 in the digital camera 2 sequentially executes various programs or pieces of data read out from a memory 14 on the basis of a control signal from the operation unit 9 to collectively control respective units in the digital camera 2.

A ROM (Read Only Memory) area of the memory 14 corresponding to a restoration filter storage device according to the invention stores therein, in addition to the various programs described above, the restoration filter 12 acquired from the restoration filter generation device 11. A RAM (Random Access Memory) area of the memory 14 serves as a work memory for the camera CPU 13 to execute the process or a transitory storage for the various pieces of data.

The lens barrel 4 has an optical system 17 including a zoom lens 15, focus lens 16 and the like incorporated therein. The zoom lens 15 and the focus lens 16 are driven by a zoom mechanism 19 and a focus mechanism 20, respectively, to be moved back and forth along an optical axis OA of the optical system 17.

A mechanical shutter 18 has a movable unit (illustration thereof is omitted) moving between a closing position where a subject light incident on a color image pickup device 23 is blocked and an opening position where the subject light incident is permitted. The mechanical shutter 18 moves the movable unit to the respective positions to open/block a path of light from the optical system 17 to the color image pickup device 23. The mechanical shutter 18 includes a diaphragm controlling a light amount of the subject light incident on the color image pickup device 23. Operations of the mechanical shutter 18, zoom mechanism 19, and focus mechanism 20 are controlled via a lens driver 24 by the camera CPU 13.

The color image pickup device 23 of single-plate type is arranged behind the optical system 17. On an image pickup surface of the color image pickup device 23, plural pixels are formed in a matrix in a predetermine pattern array (Bayer array, G-striped R/G-fully-checkered array, X-Trans (registered trademark) array, honeycomb array or the like). Each pixel is configured to include a microlens, a color filter (R (red), G (green) or B (blue) color filter in this example) and a photodiode. The color image pickup device 23, which together with the optical system 17 constitutes the image pickup device according to the invention, converts a subject image formed on the image pickup surface by the optical system 17 into an electrical output signal to output. Various kinds of image pickup devices are used as the color image pickup device 23, such as a CCD (Charge Coupled Device) color image pickup device, and a CMOS (Complementary Metal Oxide Semiconductor) color image pickup device. An image pickup device driver 25 controls the color image pickup device 23 to be driven under the control by the camera CPU 13.

A signal conditioning circuit 28 subjects the output signal output from the color image pickup device 23 to various signal conditioning processes to generate RGB mosaic image data R1, G1, and B1 (FIG. 4) associated with a color filter array of the color image pickup device 23. The signal conditioning circuit 28 is constituted by, for example, a CDS/AGC (Correlated Double Sampling/Automatic Gain Control) circuit, an A/D converter circuit or the like in a case where the color image pickup device 23 is a CCD type, and by, for example, an amplifier in a case where the device 23 is a CMOS type.

<Configuration of Image Processing Circuit>

An image processing circuit 29 corresponds to the image processing device according to the invention. The image processing circuit 29 subjects the mosaic image data R1, G1, and B1 input from the signal conditioning circuit 28 to a black level adjustment process, white balance correction process, gamma correction process, demosaic process, magnification chromatic aberration correction, YC conversion process, point restoration process and the like to generate luminance system image data Y and a color-difference system image data Cb and Cr (see FIG. 4). The luminance system image data Y and the color-difference system image data Cb and Cr are transitorily stored in a VRAM (Video RAM) area of the memory 14 (VRAM may be separately provided).

The VRAM area has a memory area for the live view image which stores the continuous images of two fields. The luminance system image data Y and color-difference system image data Cb and Cr stored in the VRAM area are sequentially output to the display unit 8. This allows the live view image to be displayed on the display unit 8.

A compression-decompression processing circuit 31 subjects the luminance system image data Y and color-difference system image data Cb and Cr stored in the VRAM area to a compression process when the shutter button 6 is pressed down during the imaging mode. The compression-decompression processing circuit 31 subjects compressed image data obtained from the memory card 10 via a media interface (I/F) 32 to a decompression process. The media I/F 32 records and reads out the compressed image data in and from the memory card 10.

Figure 4:
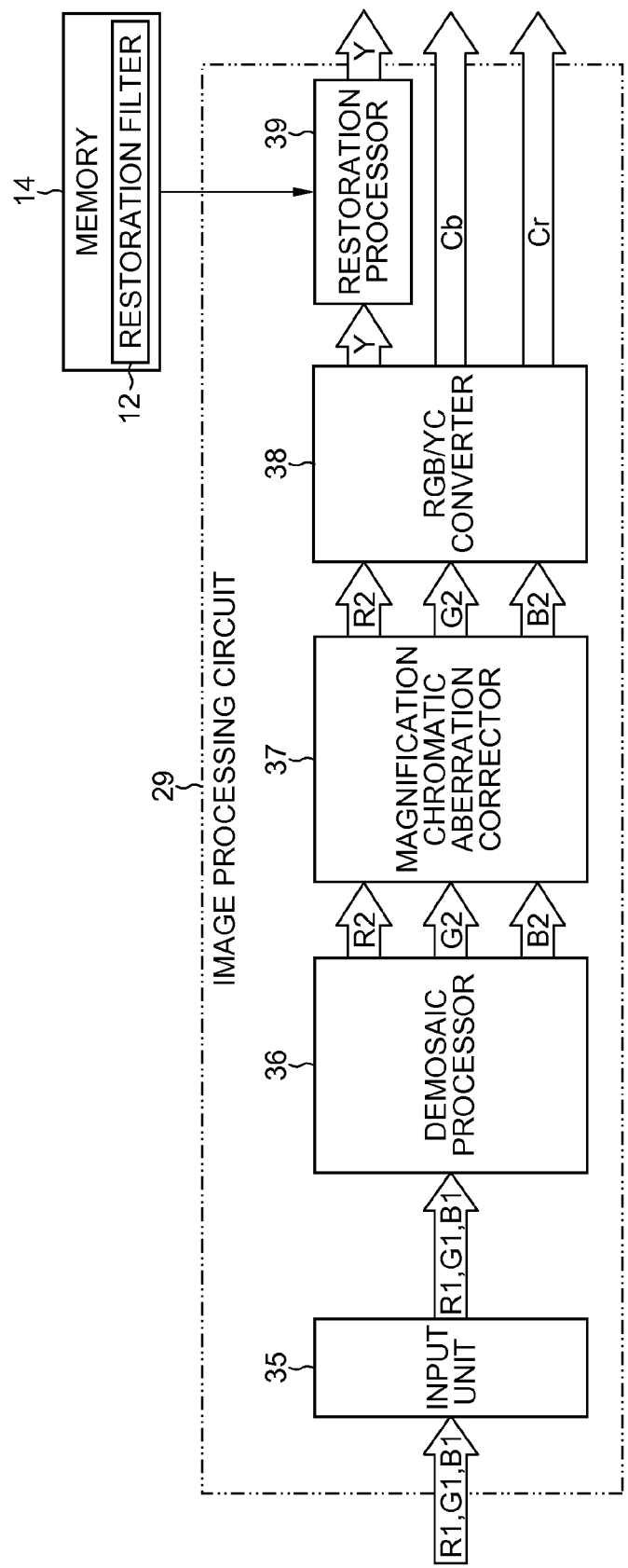
FIG. 4 is a block diagram showing an embodiment of an image processing circuit of the digital camera.

FIG. 4 is a block diagram showing an embodiment of the image processing circuit 29 in the digital camera 2.

As shown in FIG. 4, the image processing circuit 29 mainly has an input unit 35, demosaic processor 36, magnification chromatic aberration corrector (magnification chromatic aberration correction device) 37, RGB/YC converter (image data generation device) 38, and restoration processor (restoration process device) 39. The image processing circuit 29 has also correction processors for performing the white balance correction process and the gamma correction process, but an illustration and description of these correction processors are omitted.

The input unit (image data acquisition device) 35 outputs the mosaic image data R1, G1, and B1 for the respective colors of RGB input from the signal conditioning circuit 28 to the demosaic processor 36. In other words, the input unit 35 serves as an input I/F to which the image data of the respective colors obtained through capturing an image by the color image pickup device 23 is input.

The demosaic processor 36 performs the demosaic process (also referred to as a synchronization process) for calculating (synchronously converting) all of color information of RGB for each pixel on the basis of the mosaic image data R1, G1, and B1 for the respective colors to generate RGB image data R2, G2, and B2 constituted by three plane color data of RGB. The magnification chromatic aberration corrector 37 scales up or down the RGB image data R2, G2, and B2 for each color to correct the magnification chromatic aberration the optical system 17 has. A correction amount of the magnification chromatic aberration is prepared in advance depending on the magnification chromatic aberration of design of the optical system 17 and is stored in the ROM area of the memory 14, and the magnification chromatic aberration corrector 37 uses the correction amount read out correspondingly to an image pickup condition (zoom magnification, aperture value, etc.) to correct the magnification chromatic aberration.

The magnification chromatic aberration corrector 37 outputs RGB image data R3, G3, and B3 obtained by subjecting the RGB image data R2, G2, and B2 to the magnification chromatic aberration correction to the RGB/YC converter 38. Functions of the magnification chromatic aberration correction in the magnification chromatic aberration corrector 37 can be selected in response to information on magnification chromatic aberration correction ON/OFF in accordance with a user instruction at an operation unit 41 (switching device). In other words, in a case of the magnification chromatic aberration correction ON, the RGB image data R3, G3, and B3 obtained through the magnification chromatic aberration correction is output to the RGB/YC converter 38, whereas in a case of the magnification chromatic aberration correction OFF, the input RGB image data R2, G2, and B2 is output as it is to the RGB/YC converter 38 without through the magnification chromatic aberration correction.

The RGB/YC converter 38 subjects the RGB image data R3, G3, and B3 (the RGB image data R2, G2, and B2 in the case of the magnification chromatic aberration correction OFF) to the YC conversion process, to generate the luminance system image data Y and the color-difference system image data Cb and Cr. The luminance system image data Y is generated in accordance to, for example, a formula [Y=0.3R+0.6G+0.1B]. According to this formula, a contribution ratio of the G color is 60%, and thus, the G color has the contribution ratio higher than the R color (contribution ratio is 30%) and the B color (contribution ratio is 10%). Therefore, the G color is the color contributing the most to a luminance signal, of three primary colors.

Here, in the embodiment, a value of the luminance signal in a color space represented by "Y, Cb and Cr" is used and described as an example of the luminance system image data Y, on which no limitation is specifically put so long as the data contributes to the luminance of the image. The luminance system image data Y refers to various pieces of data having information on the luminance of the captured image. For example, the relevant data includes data representing a lightness L in a CIELAB (Commission internationale de l'eclairage) color space, data having the highest contribution ratio for acquiring the luminance signal, and data corresponding to the color filter of a color the most contributing to the luminance.

The restoration processor 39 reads out the restoration filter 12 stored in the memory 14 and uses this restoration filter 12 to subject the luminance system image data Y to the restoration process. This restoration process is performed on only the luminance system image data Y having a large visual effect in order to reduce a load on an arithmetic process. Performing of the restoration process allows an image blur to be modified as shown in FIG. 5.

Figure 5:
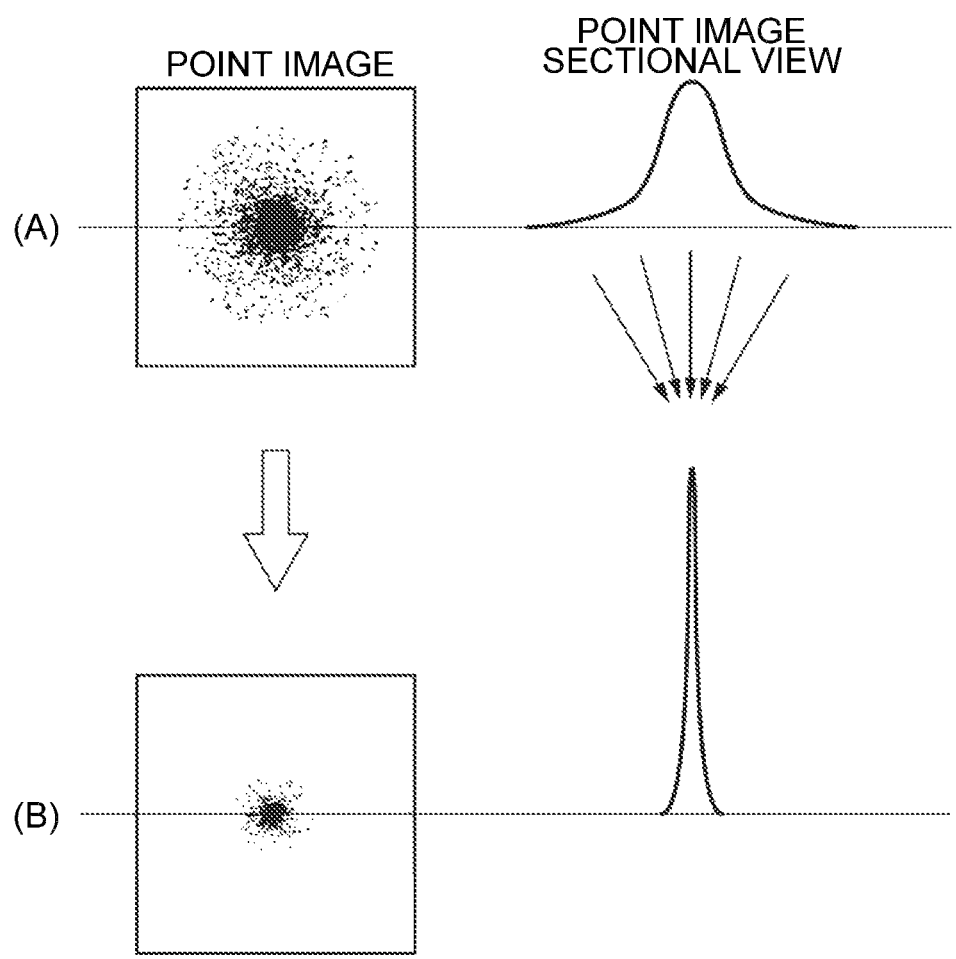
FIG. 5 is an illustration used for explaining the restoration process.

As shown in (A) portion of FIG. 5, a point image (optical image) having been transmitted through the optical system 17 is formed into an image as a large point image (blurred image) on the image pickup surface of the color image pickup device 23, but restored to a small point image (high resolution image) as shown in (B) portion of FIG. 5 through the restoration process.

<Configuration of Restoration Filter Generation Device>

With reference back to FIG. 3, the restoration filter generation device 11 generates the restoration filter 12 used for the restoration process in the digital camera 2. The restoration filter generation device 11 includes a device CPU 40, operation unit 41, storage 43, and communication I/F 44.

The device CPU 40 adequately reads out and executes various programs from the storage 43 on the basis of an operation instruction input to the operation unit 41 to collectively control the entire device. The operation unit 41 is a keyboard or a mouse, for example.

The storage 43 stores therein a restoration filter generation program 46 according to the invention, a point spread function ($PSF_R$, $PSF_G$, $PSF_B$) corresponding to a first transfer function concerning the point spread for each color of RGB in the optical system 17, correction information on the magnification chromatic aberration of the optical system 17, and the like.

The communication I/F 44 is coupled to a PSF measurement device 49 for measuring the PSF for the optical system 17. Here, a method of measuring the $PSF_R$, $PSF_G$, and $PSF_B$ by the PSF measurement device 49 is a well-known technology, a description of which is omitted. The communication I/F 44 acquires and stores in the storage 43 the point spread functions ($PSF_R$, $PSF_G$, $PSF_B$) for the respective colors of RGB corresponding to optical system 17 from the PSF measurement device 49 under the control by the device CPU 40.

The communication I/F 44 which is connectable with a communication I/F (illustration thereof is omitted) in the digital camera 2 via various communication cables and communication lines (including wireless) sends the restoration filter 12 generated in the device CPU 40 to the digital camera 2. This allows the restoration filter 12 to be stored in the memory 14 of the digital camera 2.

<Restoration Filter Generation Process>

The device CPU 40, in a case where a restoration filter generating operation is made in the operation unit 41, reads out and executes the restoration filter generation program 46 from the storage 43 to serve as first and second transfer function acquisition parts 51 and 52 (first and second transfer function acquisition device), third to fifth transfer function calculation parts 53 to 55 (third to fifth transfer function calculation device), correction information acquisition part 56 (correction information acquisition device), and restoration filter generation part 57 (restoration filter generation device) which are described later for generating the restoration filter 12 corresponding to the luminance system image data Y. The operation of the device CPU 40 is described in detail later.

The PSF has various sizes, shapes, and intensity distributions depending on an imaging condition such as an imaging magnification and an aperture value and a position in an image plane, and is different for each color of RGB because the aberration of the optical system is different depending on a wavelength.

Figure 6A:
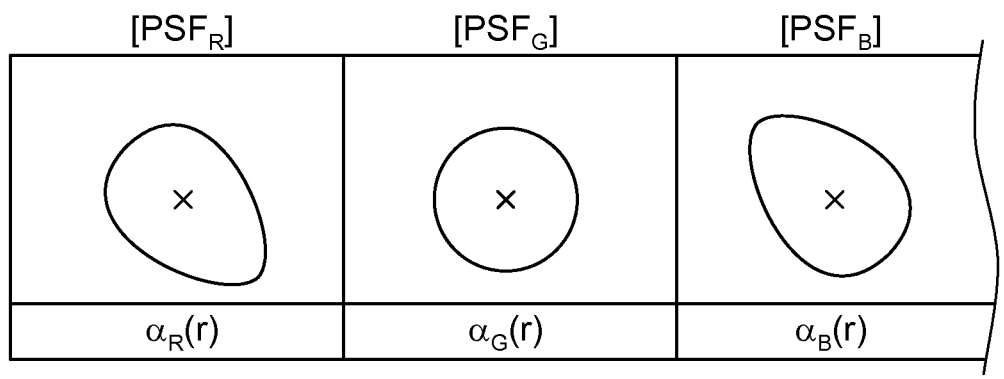
FIG. 6A is a conceptual diagram used for explaining $PSF_R$, $PSF_G$, and $PSF_B$ for respective colors of RGB stored in a storage.

FIG. 6A is a conceptual diagram of the $PSF_R$, $PSF_G$, and $PSF_B$, stored in the storage 43, for the respective colors of RGB on an image plane corresponding to a point light source on an object surface.

A data format for the $PSF_R$, $PSF_G$, and $PSF_B$ shown in FIG. 6A includes PSF data in which gravity center positions of the $PSF_R$, $PSF_G$, and $PSF_B$ coincide with each other (data arranged such that a PSF gravity center is at the center (coordinates of x=0, y=0)), and data $\alpha_R(r)$, $\alpha_G(r)$, and $\alpha_B(r)$ representing the respective gravity center positions.

Figure 6B:
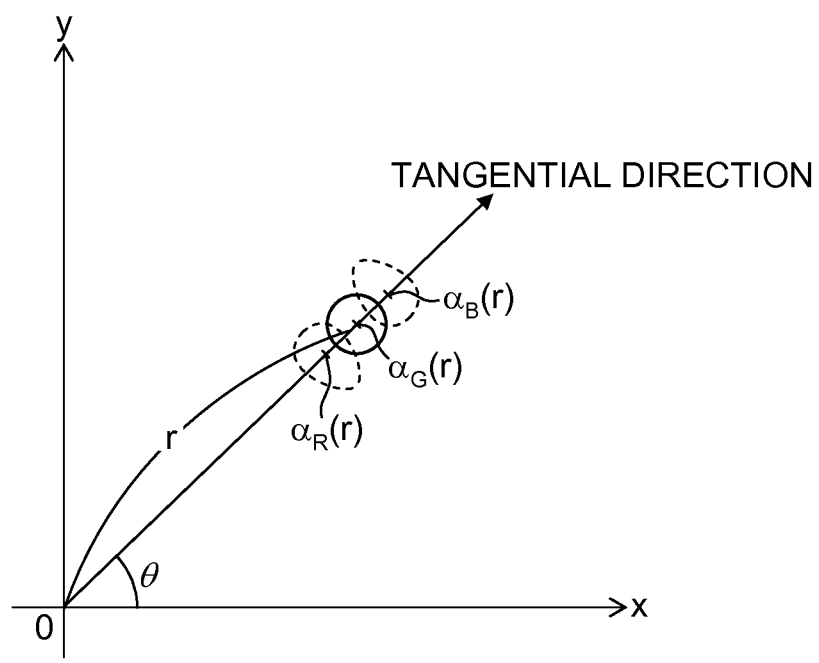
FIG. 6B is a conceptual diagram used for explaining $PSF_R$, $PSF_G$, and $PSF_B$ for the respective colors of RGB stored in the storage.

For the purpose of simple description, assume that each of the gravity center positions $\alpha_R(r)$, $\alpha_G(r)$, and $\alpha_B(r)$ is a position corresponding to an image height position r at which a point light source is to be formed into an image as shown in FIG. 6B. The gravity center positions $\alpha_R(r)$, $\alpha_G(r)$, and $\alpha_B(r)$ of the $PSF_R$, $PSF_G$, and $PSF_B$ are shifted in a tangential direction due to the magnification chromatic aberration as shown in FIG. 6B.

The magnification chromatic aberration correction is performed such that in a case where the magnification chromatic aberration correction is performed using a G plane as a reference, the color image of each of an R plane and a B plane is scaled up or down to decrease a positional shift by $\alpha_R(r)-\alpha_G(r)$ for the R plane and by $\alpha_B(r)-\alpha_G(r)$ for the B plane on the basis of the gravity center positions $\alpha_R(r)$, $\alpha_G(r)$, and $\alpha_B(r)$ of the $PSF_R$, $PSF_G$, and $PSF_B$ for the respective colors of RGB at the image height position r.

However, generally, an arbitrary coordinate transformation cannot necessarily be attained for a convenience of mounting, but the magnification chromatic aberration correction can be performed only in a range according to a specific parametric model. In other words, the magnification chromatic aberration corrector 37 shown in FIG. 4 corrects the magnification chromatic aberration the optical system 17 has by adequately scaling up or down the R and B image data in accordance with the correction amount of the magnification chromatic aberration which is prepared in advance depending on the magnification chromatic aberration of design of the optical system 17.

Therefore, the magnification chromatic aberration correction by the magnification chromatic aberration corrector 37 cannot make such correction that the gravity center positions $\alpha_R(r)$, $\alpha_G(r)$, and $\alpha_B(r)$ of the $PSF_R$, $PSF_G$, and $PSF_B$ for the respective colors of RGB perfectly coincide with each other, but a correction residue is brought about.

Here, assume that the correction amounts in the magnification chromatic aberration correction are represented as $\beta_R(r)$ and $\beta_B(r)$, correction residual amounts $\gamma_R(r)$ and $\gamma_B(r)$ after the magnification chromatic aberration correction may be expressed by Formula below.

$$\gamma_R(r)=(\alpha_R(r)-\alpha_G(r))-\beta_R(r)$$

$$\gamma_B(r)=(\alpha_B(r)-\alpha_G(r))-\beta_B(r) \quad \text{[Formula 1]}$$

The restoration processor 39 uses the restoration filter 12 with respect to the luminance system image data Y generated from the RGB image data R3, G3, and B3 after the magnification chromatic aberration correction to perform the restoration process as shown in FIG. 4. For this reason, in generating the restoration filter 12, if the correction residue exists in the magnification chromatic aberration correction, the gravity center positions of the $PSF_R$, $PSF_G$, and $PSF_B$ for the respective colors of RGB (FIG. 6A and FIG. 6B) are positionally shifted in the tangential direction to degrade an MTF for the luminance in the tangential direction.

Therefore, the restoration filter is generated in the restoration process for the luminance with taking into account the above MTF degradation according to a procedure described below in the invention.

First, a $PSF_R(x,y)$ and a $PSF_B(x,y)$ where the PSF gravity centers are arranged at the center (coordinates of x=0 and y=0) are parallelly translated by the correction residual amounts $\gamma_R(r)$ and $\gamma_B(r)$, respectively on the basis of the correction residual amounts $\gamma_R(r)$ and $\gamma_B(r)$ expressed by [Formula 1].

Specifically, the $PSF_R(x,y)$ and the $PSF_B(x,y)$ are parallelly translated as expressed by Formula below.

$$PSF_R(x,y):PSF_R(x+\gamma_R(r)\cos\theta \cdot y+\gamma_R(r)\sin\theta)$$

$$PSF_B(x,y):PSF_B(x+\gamma_B(r)\cos\theta \cdot y+\gamma_B(r)\sin\theta) \quad \text{[Formula 2]}$$

Where $\theta$ is an angle representing the tangential direction at a position in image-plane as shown in FIG. 6B.

Subsequently, on the basis of the $PSF_G(x,y)$, $PSF_R(x+\gamma_R(r)\cos\theta, y+\gamma_R(r)\sin\theta)$ and $PSF_B(x+\gamma_B(r)\cos\theta, y+\gamma_B(r)\sin\theta)$ obtained by parallelly translating depending on the correction residual amounts $\gamma_R(r)$ and $\gamma_B(r)$, respectively, and weighting coefficients $c_R$, $c_G$, and $c_B$, $PSF_Y(x,y)$ with respect to the luminance system image data Y is calculated according to a weighted linear sum as expressed by Formula below.

$$PSF_Y(x, y) = c_R \cdot PSF_R(x + r_R(r)\cos\theta, y + r_R(r)\sin\theta) + \\ c_G \cdot PSF_G(x, y) + c_B \cdot PSF_B(x + r_B(r)\cos\theta, y + r_B(r)\sin\theta) \quad \text{[Formula 3]}$$

As for the weighting coefficients $c_R$, $c_G$, $c_B$, the same coefficient as the coefficient used in generating the luminance system image data Y from the RGB image data may be used, but the invention is not limited thereto.

The $PSF_Y(x,y)$ calculated in this way is used to generate the restoration filter with respect to the luminance system image data Y. This method is characterized in that phase information remains so that phase correction is enabled as compared with a case where the MTF described later is used.

First Embodiment

Figure 7:
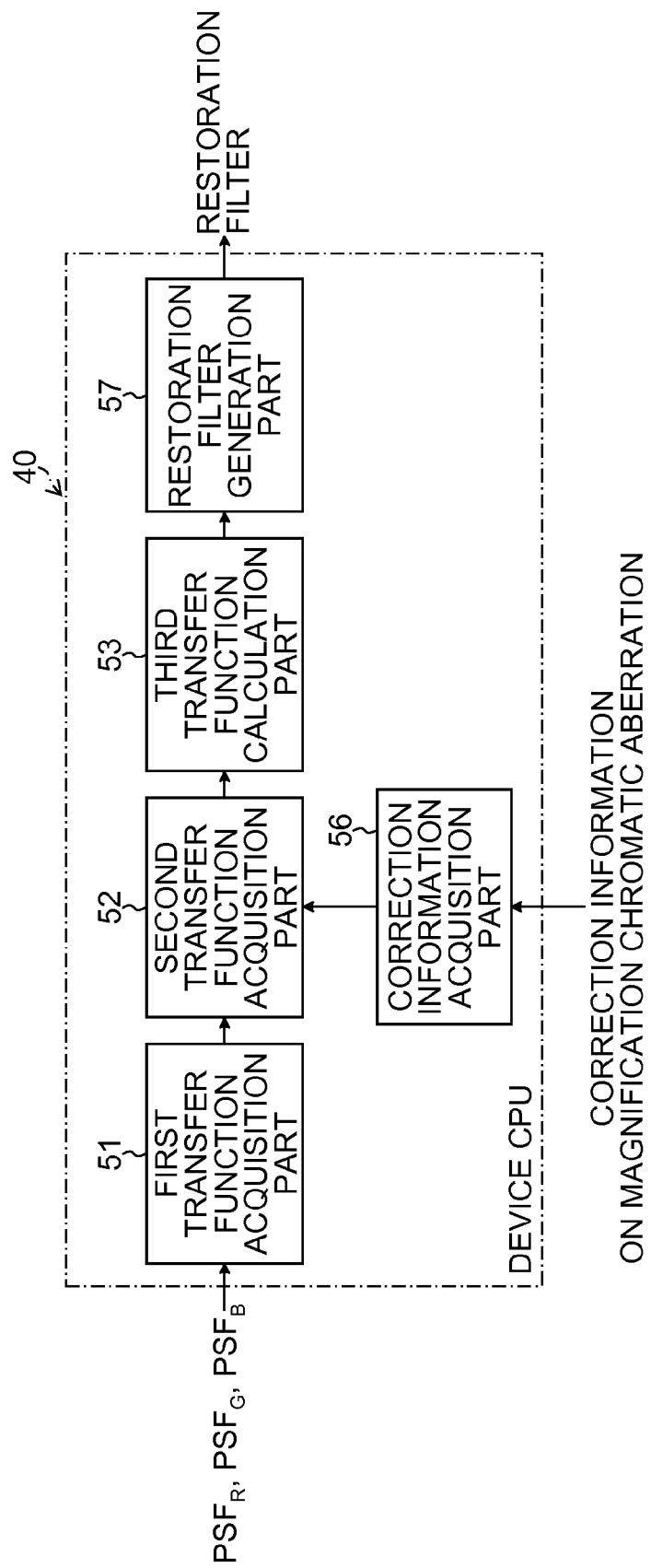
FIG. 7 is a block diagram showing a first embodiment of the restoration filter generation device.

FIG. 7 is a block diagram showing a first embodiment of the restoration filter generation device 11 and is a functional block diagram mainly showing a functionality of the device CPU 40 shown in FIG. 3.

The device CPU 40 includes the first and second transfer function acquisition parts 51 and 52 (first and second transfer function acquisition device), the third transfer function calculation part 53 (third transfer function calculation device), the correction information acquisition part 56 (correction information acquisition device), and the restoration filter generation part 57 (restoration filter generation device).

The first transfer function acquisition part 51 acquires from the storage 43 the first transfer functions ($PSF_R$, $PSF_G$, and $PSF_B$ for the respective colors of RGB) concerning the point spread of the optical system 17 to output the $PSF_R$, $PSF_G$, and $PSF_B$, and the gravity center positions $\alpha_R(r)$, $\alpha_G(r)$, and $\alpha_B(r)$ of the $PSF_R$, $PSF_G$, and $PSF_B$ to the second transfer function acquisition part 52. The $PSF_R$, $PSF_G$, and $PSF_B$ are arranged such that the gravity center of each PSF is at the center (coordinates of x=0 and y=0) as described in FIG. 6A.

The correction information acquisition part 56 acquires from the storage 43 the correction amounts $\beta_R(r)$ and $\beta_B(r)$ for correcting the magnification chromatic aberration of the optical system 17, the correction amounts $\beta_R(r)$ and $\beta_B(r)$ at the image height position r being corrected by the magnification chromatic aberration corrector 37 shown in FIG. 4 (correction amounts for R and B pixels in the tangential direction with the G pixel used as a reference shown in FIG. 6B) to output the acquired correction amounts $\beta_R(r)$ and $\beta_B(r)$ to the second transfer function acquisition part 52. It goes without saying that the correction amounts $\beta_R(r)$ and $\beta_B(r)$ vary depending on the image height positions of the acquired $PSF_R$, $PSF_G$, and $PSF_B$.

The second transfer function acquisition part 52 calculates the correction residual amounts $\gamma_R(r)$ and $\gamma_B(r)$ after the magnification chromatic aberration correction according to [Formula 1] described above on the basis of the gravity center positions $\alpha_R(r)$, $\alpha_G(r)$, and $\alpha_B(r)$ of the $PSF_R$, $PSF_G$, and $PSF_B$ input from the first transfer function acquisition part 51, and the correction amounts $\beta_R(r)$ and $\beta_B(r)$ of the magnification chromatic aberration input from the correction information acquisition part 56. Then, the $PSF_R$ and $PSF_B$ are parallelly translated as expressed by [Formula 2] described above so as to offset the correction residual amounts $\gamma_R(r)$ and $\gamma_B(r)$ on the basis of the calculated correction residual amounts $\gamma_R(r)$ and $\gamma_B(r)$ and the angle $\theta$ indicating the tangential direction in the position in image-plane.

The second transfer function acquisition part 52 outputs the $PSF_G$ acquired from the first transfer function acquisition part 51 and the $PSF_R$ and $PSF_B$ parallelly translated on the basis of the correction residual amounts $\gamma_R(r)$ and $\gamma_B(r)$ as the second transfer functions to the third transfer function calculation part 53.

The third transfer function calculation part 53 calculates the weighted linear sum of the input second transfer functions for the respective colors of RGB according to [Formula 3] described above to output the calculation result as the $PSF_Y(x,y)$ (third transfer function) with respect to the luminance system image data Y to the restoration filter generation part 57.

The restoration filter generation part 57 uses the input $PSF_Y(x,y)$ to generate a restoration filter with respect to the luminance system image data Y.

In general, a convolution type Wiener filter may be used for blur restoration by way of the PSF. Referring to information on an OTF obtained through the Fourier transform of the $PSF_Y(x,y)$ and an S/N ratio, a frequency characteristic $d(\omega_x,\omega_y)$ of the restoration filter can be calculated according to a formula below.

$$d(\omega_x, \omega_y) = \frac{H^*(\omega_x, \omega_y)}{\|H(\omega_x, \omega_y)\|^2 + 1/SNR(\omega_x, \omega_y)} \quad \text{[Formula 4]}$$

Where $H(\omega_x,\omega_y)$ represents an OTF, and $H^*(\omega_x,\omega_y)$ represents its complex conjugate. $SNR(\omega_x,\omega_y)$ represents an S/N ratio.

Design of a filter coefficient for the restoration filter is an optimization problem for selecting a value of the coefficient such that the filter frequency characteristic is the closest to a desired Wiener frequency characteristic, and the filter coefficient is properly calculated by any well-known method.

This restoration filter design is a problem for finding $$x \in \mathcal{R}^N \quad \text{[Formula 5]}$$

which minimizes an evaluation functional Jp[x]. The functional Jp[x] is to define a closeness between an ideal frequency characteristic $d(\omega_x,\omega_y)$ for the restoration filter and a frequency characteristic for an actual filter attained by a filter coefficient x according to any well-known evaluation method. Since a range of the frequency characteristic capable of attaining a filter depends on a filter format, the evaluation functional is defined differently depending on an identifier p.

A filter coefficient $x_0$ to be found may be expressed as below.

$$x_0 = \underset{x \in \mathcal{R}^N}{\operatorname{argmin}} J_p[x] \quad \text{[Formula 6]}$$

The device CPU 40 calculates each restoration filter (the filter coefficient of the restoration filter) on the basis of the position in image-plane, and the correction information on the first transfer function and magnification chromatic aberration for each image pickup condition (zoom magnification, aperture value, etc.) as described above.

Second Embodiment

Figure 8:
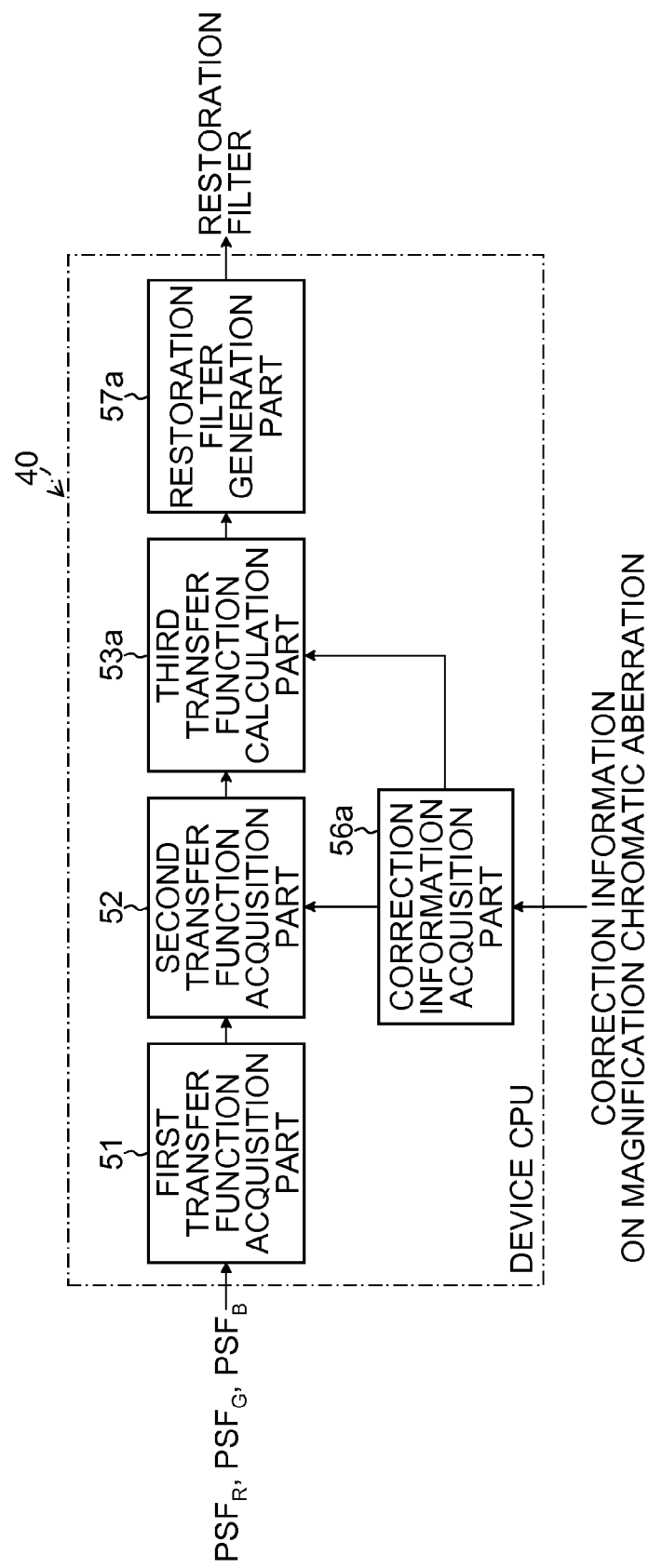
FIG. 8 is a block diagram showing a second embodiment of the restoration filter generation device.

FIG. 8 is a block diagram showing a second embodiment of the restoration filter generation device 11, and is a functional block diagram mainly showing a functionality of the device CPU 40 shown in FIG. 3. Parts in common with the first embodiment shown in FIG. 7 are designated by the same reference numerals and a detailed description thereof is omitted.

In FIG. 8, a correction information acquisition part 56a (correction accuracy evaluation device) acquires from the storage 43 the correction amounts $\beta_R(r)$ and $\beta_B(r)$ for correcting the magnification chromatic aberration of the optical system 17 as well as information indicating reliability of the magnification chromatic aberration correction on the basis of the correction amounts $\beta_R(r)$ and $\beta_B(r)$ (information indicating reliability of the correction amounts $\beta_R(r)$ and $\beta_B(r)$ or correction residual amounts $\gamma_R(r)$ and $\gamma_B(r)$ of the magnification chromatic aberration).

In other words, in a situation where the correction amount of the magnification chromatic aberration cannot be accurately found (the correction accuracy of the magnification chromatic aberration is low) or can vary because of large variations in individual lenses and variations in lens characteristics due to stabilizing control, the reliability is low of the correction amounts $\beta_R(r)$ and $\beta_B(r)$ or correction residual amounts $\gamma_R(r)$ and $\gamma_B(r)$ of the magnification chromatic aberration.

The storage 43 stores therein the information indicating the reliability of the magnification chromatic aberration correction as described above. The correction information acquisition part 56a acquires from the storage 43 the information indicating the reliability of the magnification chromatic aberration correction to output information indicating whether or not the reliability of the magnification chromatic aberration correction is lower than a reference value (evaluation information indicating whether or not the correction accuracy of the magnification chromatic aberration is equal to or lower than a threshold) to the third transfer function calculation part 53a. Here, the reference value for determining whether or not the reliability of the magnification chromatic aberration correction is low refers to whether or not the color shift is possibly rather increased if the restoration process is performed by way of the restoration filter generated from the $PSF_Y(x,y)$ in the first embodiment because the correction residual amount of the magnification chromatic aberration correction is not accurately found.

The third transfer function calculation part 53a mixes the $PSF_G$ input from the second transfer function acquisition part 52 and the $PSF_R$ and $PSF_B$ having been parallelly translated depending on the correction residual amounts $\gamma_R(r)$ and $\gamma_B(r)$ to create the $PSF_Y(x,y)$ (third transfer function) with respect to the luminance system image data Y, but deletes the phase information from the $PSF_Y(x,y)$ when the information indicating that the reliability of the magnification chromatic aberration correction is low is input from the correction information acquisition part 56a. Specifically, the $PSF_Y(x,y)$ is subjected to the Fourier transform to calculate an $OTF_Y(\omega_x,\omega_y)$, of which amplitude (absolute value) is taken to calculate an $MTF_Y(\omega_x,\omega_y)$. Then, if the reliability of the magnification chromatic aberration correction is high, the third transfer function calculation part 53 outputs the $PSF_Y(x,y)$ as the third transfer function to the restoration filter generation part 57a. On the other hand, if the reliability of the magnification chromatic aberration correction is low, the third transfer function calculation part 53 outputs the $OTF_Y(\omega_x,\omega_y)$ from which the phase information is removed, that is, the $MTF_Y(\omega_x,\omega_y)$, as the third transfer function to the restoration filter generation part 57a.

The restoration filter generation part 57a uses the $PSF_Y(x,y)$ or $MTF_Y(\omega_x,\omega_y)$ input from the third transfer function calculation part 53a to generate the restoration filter for the restoration process on the luminance system image data Y depending on whether or not the reliability of the magnification chromatic aberration correction is high. This makes it possible to generate the restoration filter which does not perform the phase correction in the restoration process if the reliability of the magnification chromatic aberration correction is low and to generate the restoration filter capable of the optimal restoration process even in the case of the unclear correction residual amount according to the magnification chromatic aberration. Note that since positional shift correlation between colors (correction residual amount) is taken into account in calculating the MTF, the degree of MTF degradation in the tangential direction can be reduced as compared with simple MTF mixing, etc. described later.

Third Embodiment

Figure 9:
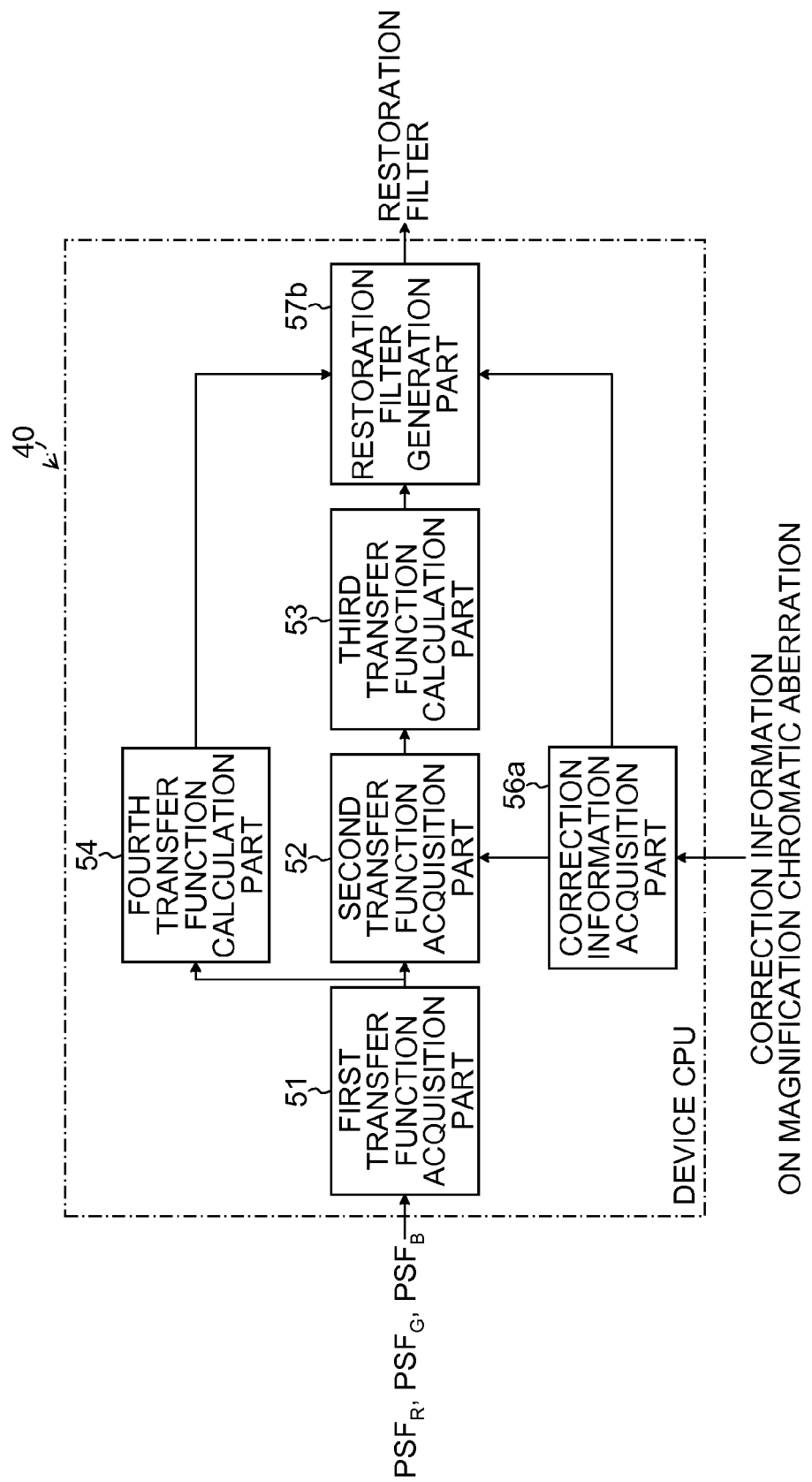
FIG. 9 is a block diagram showing a third embodiment of the restoration filter generation device.

FIG. 9 is a block diagram showing a third embodiment of the restoration filter generation device 11 and is a functional block diagram mainly showing a functionality of the device CPU 40 shown in FIG. 3. Parts in common with the first and second embodiments shown in FIG. 7 and FIG. 8 are designated by the same reference numerals and a detailed description thereof is omitted.

The third embodiment is an embodiment in which the method for generating the restoration filter is switched over depending on whether or not the reliability of the magnification chromatic aberration correction is low as in the second embodiment.

In FIG. 9, a fourth transfer function calculation part 54 (fourth transfer function calculation device) receives the $PSF_R$, $PSF_G$, and $PSF_B$ for the respective colors of RGB from the first transfer function acquisition part 51 to calculate $MTF_R(\omega_x,\omega_y)$, $MTF_G(\omega_x,\omega_y)$, and $MTF_B(\omega_x,\omega_y)$ obtained by removing the phase information from the $PSF_R$, $PSF_G$, and $PSF_B$, respectively. These $MTF_R(\omega_x,\omega_y)$, $MTF_G(\omega_x,\omega_y)$, and $MTF_B(\omega_x,\omega_y)$ can be calculated in such a way that the $PSF_R$, $PSF_G$, and $PSF_B$ are respectively subjected to the Fourier transform to calculate $OTF_R(\omega_x,\omega_y)$, $OTF_G(\omega_x,\omega_y)$, and $OTF_B(\omega_x,\omega_y)$, of which absolute values are taken. Then, the calculated $MTF_R(\omega_x,\omega_y)$, $MTF_G(\omega_x,\omega_y)$, and $MTF_B(\omega_x,\omega_y)$ are mixed to calculate an $MTF_Y(\omega_x,\omega_y)$ (fourth transfer function) with respect to the luminance system image data Y.

The calculation of the $MTF_Y(\omega_x,\omega_y)$ by the fourth transfer function calculation part 54 can be performed on the basis of the $MTF_R(\omega_x,\omega_y)$, $MTF_G(\omega_x,\omega_y)$ and $MTF_B(\omega_x,\omega_y)$, and the weighting coefficients $c_R$, $c_G$, and $c_B$ according to a formula below.

$$MTF_Y(\omega_x, \omega_y) = \sqrt{c_R^2 MTF_R^2(\omega_x, \omega_y) + c_G^2 MTF_G^2(\omega_x, \omega_y) + c_B^2 MTF_B^2(\omega_x, \omega_y)}$$ [Formula 7]

In other words, the fourth transfer function calculation part 54 calculates a square root of a sum of squares of values obtained by multiplying the $MTF_R(\omega_x,\omega_y)$, $MTF_G(\omega_x,\omega_y)$, and $MTF_B(\omega_x,\omega_y)$ by the weighting coefficients $c_R$, $c_G$, and $c_B$, respectively to calculate the $MTF_Y(\omega_x,\omega_y)$ with respect to the luminance system image data Y.

Another method for mixing the MTF in which the $MTF_R(\omega_x,\omega_y)$, $MTF_G(\omega_x,\omega_y)$, and $MTF_B(\omega_x,\omega_y)$ are mixed to calculate the $MTF_Y(\omega_x,\omega_y)$ with respect to the luminance system image data Y may be performed on the basis of the weighting coefficients $c_R$, $c_G$, and $c_B$ according to a formula below.

$$MTF_Y(\omega_x,\omega_y)=c_R MTF_R(\omega_x,\omega_y)+c_G MTF_G(\omega_x,\omega_y)+c_B MTF_B(\omega_x,\omega_y)$$ [Formula 8]

In other words, the fourth transfer function calculation part 54 may find the $MTF_Y(\omega_x,\omega_y)$ by calculating the weighted linear sum on the basis of the $MTF_R(\omega_x,\omega_y)$, $MTF_G(\omega_x,\omega_y)$, and $MTF_B(\omega_x,\omega_y)$, and the weighting coefficients $c_R$, $c_G$, and $c_B$.

The $MTF_Y(\omega_x,\omega_y)$ with respect to the luminance system image data Y calculated by the fourth transfer function calculation part 54 is output as the fourth transfer function to a restoration filter generation part 57b.

The restoration filter generation part 57b generates the restoration filter for the restoration process on the luminance system image data Y using the third transfer function ($PSF_Y$ (x,y)) input from the third transfer function calculation part 53 or the fourth transfer function (MTF$_Y(\omega_x,\omega_y)$) input from the fourth transfer function calculation part 54, depending on the information indicating whether or not the reliability of the magnification chromatic aberration correction is high, the information being input from the correction information acquisition part 56a. In other words, it is possible to generate the restoration filter which uses the MTF$_Y(\omega_x,\omega_y)$ and does not perform the phase correction in the restoration process if the reliability of the magnification chromatic aberration correction is low.

This allows the restoration filter capable of the proper restoration process to be generated even in the case of the unclear correction residual amount according to the magnification chromatic aberration due to the variations or the like.

Fourth Embodiment

Figure 10:
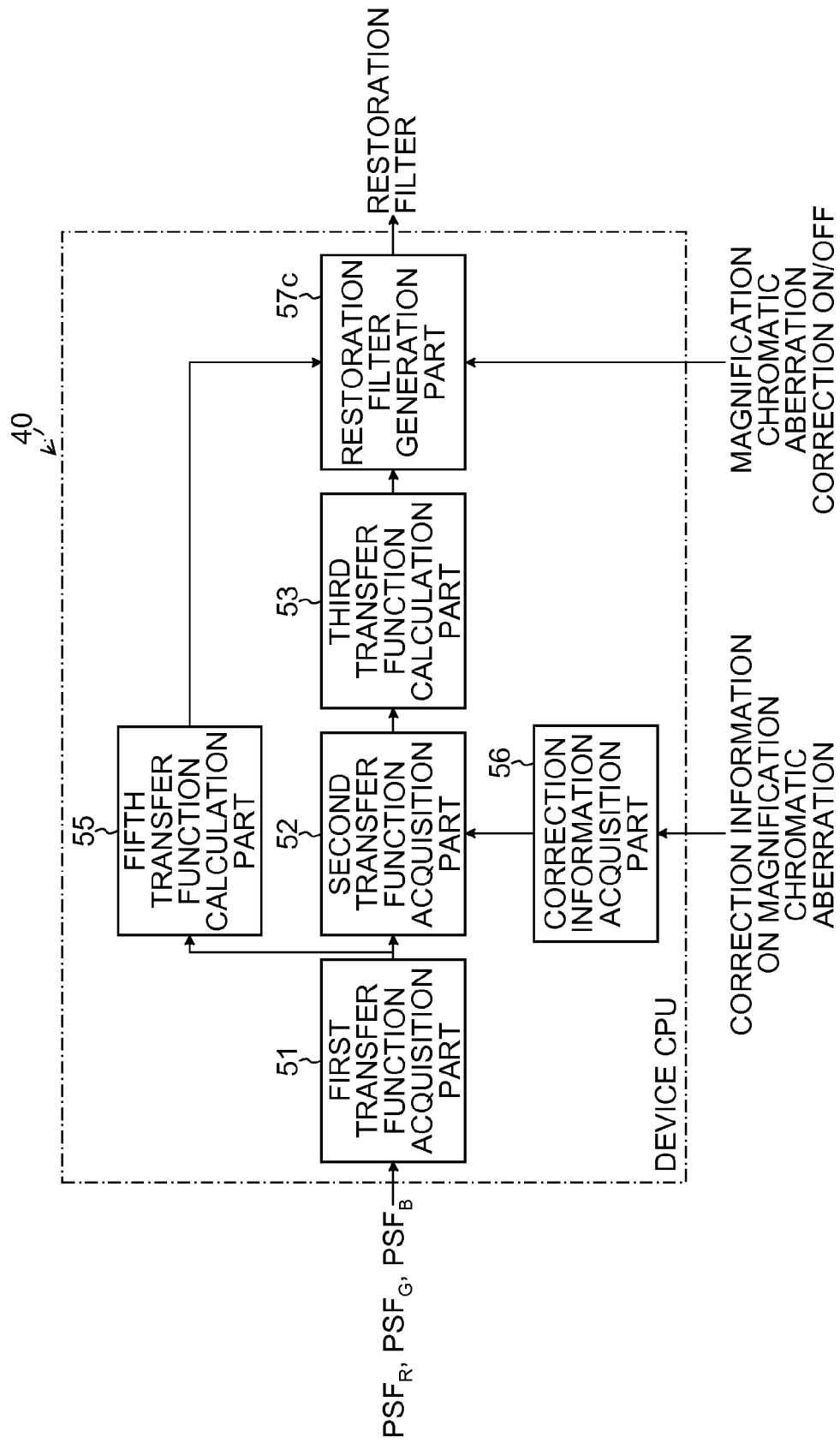
FIG. 10 is a block diagram showing a fourth embodiment of the restoration filter generation device.

FIG. 10 is a block diagram showing a fourth embodiment of the restoration filter generation device 11 and is a functional block diagram mainly showing a functionality of the device CPU 40 shown in FIG. 3. Parts in common with the first embodiment shown in FIG. 7 are designated by the same reference numerals and a detailed description thereof is omitted.

The fourth embodiment is an embodiment in which the method for generating the restoration filter is switched over depending on whether the case is of performing the magnification chromatic aberration correction (magnification chromatic aberration correction ON) or of not performing the magnification chromatic aberration correction (magnification chromatic aberration correction OFF).

In FIG. 10, the fifth transfer function calculation part 55 (fifth transfer function calculation device) receives from the first transfer function acquisition part 51 the PSF$_R$, PSF$_G$, and PSF$_B$ for the respective colors of RGB and the gravity center positions $\alpha_R(r)$, $\alpha_G(r)$, and $\alpha_B(r)$ of the PSF$_R$, PSF$_G$, and PSF$_B$ to calculate the correction residual amounts $\gamma_R(r)$ and $\gamma_B(r)$ according to [Formula 1] described above. Here, the correction residual amounts $\gamma_R(r)$ and $\gamma_B(r)$ in the case of the magnification chromatic aberration correction OFF can be calculated by setting zero to each of the correction amounts $\beta_R(r)$ and $\beta_B(r)$ in [Formula 1] in the magnification chromatic aberration correction.

On the basis of the correction residual amounts $\gamma_R(r)$ and $\gamma_B(r)$ calculated in this way, the PSF$_R$(x,y) and PSF$_B$(x,y) are calculated by the parallel translation according to [Formula 2] described above depending on the correction residual amounts $\gamma_R(r)$ and $\gamma_B(r)$. The fifth transfer function calculation part 55 mixes the PSF$_G$ input from the first transfer function acquisition part 51 with the PSF$_R$ and PSF$_B$ having been parallelly translated to calculate the PSF$_Y$(x,y) with respect to the luminance system image data Y and output this PSF$_Y$(x,y) as a fifth transfer function to a restoration filter generation part 57c. Note that PSF mixing of RGB can be performed according to [Formula 3].

The restoration filter generation part 57c receives the information on the magnification chromatic aberration correction ON/OFF in accordance with a user instruction at the operation unit 41 (switching device) shown in FIG. 3 or the information on the magnification chromatic aberration correction ON/OFF set in the storage 43 (switching device) to generate the restoration filter for the restoration process on the luminance system image data Y using the third transfer function (PSF$_Y$(x,y)) input from the third transfer function calculation part 53 or the fifth transfer function (PSF$_Y$(x,y)) input from the fifth transfer function calculation part 55, depending on the information on the magnification chromatic aberration correction ON/OFF.

In other words, in the case where the magnification chromatic aberration correction is OFF (in the case of being switched so as not to perform the magnification chromatic aberration correction), since the restoration filter generation part 57c uses the fifth transfer function input from the fifth transfer function calculation part 55 to generate the restoration filter, it is possible to generate the restoration filter capable of correcting, through the restoration process on the luminance system image data, the degree of the MTF degradation in the luminance system image data caused by that the magnification chromatic aberration correction is not performed.

Fifth Embodiment

Figure 11:
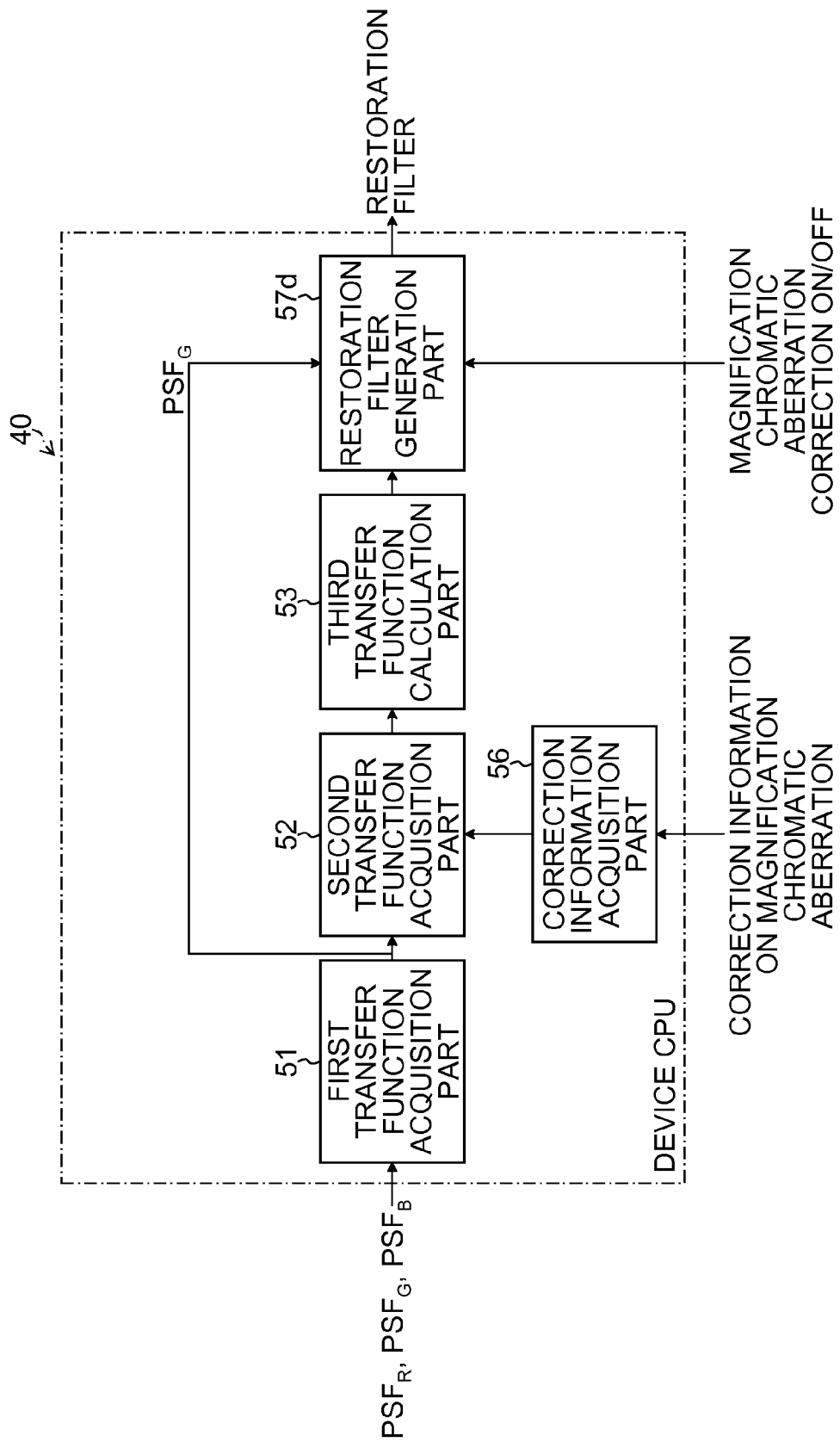
FIG. 11 is a block diagram showing a fifth embodiment of the restoration filter generation device.

FIG. 11 is a block diagram showing a fifth embodiment of the restoration filter generation device 11 and is a functional block diagram mainly showing a functionality of the device CPU 40 shown in FIG. 3. Parts in common with the fourth embodiment shown in FIG. 10 are designated by the same reference numerals and a detailed description thereof is omitted.

The fifth embodiment is another embodiment in which the method for generating the restoration filter is switched over depending on the magnification chromatic aberration correction ON/OFF.

In FIG. 11, a restoration filter generation part 57d has the third transfer function (PSF$_Y$(x,y)) added from the third transfer function calculation part 53 and the PSF$_G$(x,y) for G added from the first transfer function acquisition part 51. The restoration filter generation part 57d generates the restoration filter for the restoration process on the luminance system image data Y using the PSF$_Y$(x,y) input from the third transfer function calculation part 53 or the PSF$_G$(x,y) for G input from the first transfer function acquisition part 51, depending on the information on the magnification chromatic aberration correction ON/OFF.

Here, in the case where the magnification chromatic aberration correction is OFF (in the case of being switched so as not to perform the magnification chromatic aberration correction), the restoration filter generation part 57d uses a monochromatic (G) PSF$_G$(x,y) to generate the restoration filter. Therefore, it is possible to generate the restoration filter in which the frequency emphasis is hard to occur in the tangential direction in the restoration process, as compared with the restoration filter generated using the PSF$_Y$ which is obtained by mixing the PSF$_R$, PSF$_G$, and PSF$_B$ for the respective colors of RGB.

Figure 12:
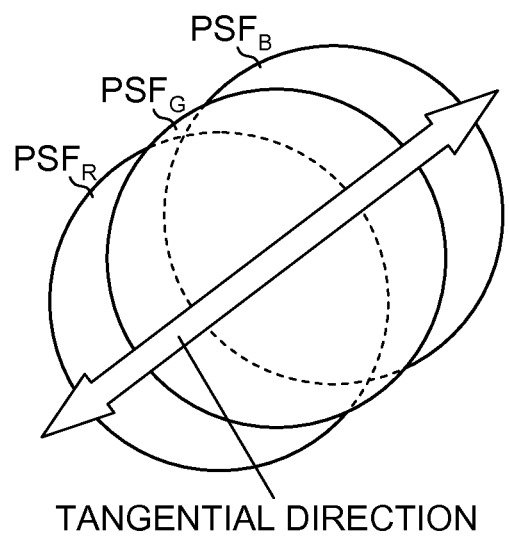
FIG. 12 is a diagram illustrating a case where a phase shift is generated in the $PSF_R$, $PSF_G$, and $PSF_B$ in a tangential direction.

In a case where the phase shift is generated in the PSF$_R$, PSF$_G$, and PSF$_B$ in the tangential direction as shown in FIG. 12, the PSF$_Y$ generated by mixing the PSF$_R$, PSF$_G$, and PSF$_B$ has the degree of the MTF degradation occurring in the tangential direction. For this reason, the restoration filter generated from this PSF$_Y$ is to emphasize the restoration in a direction of the degradation.

In other words, in a case where a degree of the MTF degradation is small in the tangential direction and a degraded MTF value is larger than a threshold defined from the S/N ratio, the frequency is emphasized in the tangential direction to make the chromatic aberration distinct in some cases (a case where the chromatic aberration at an edge portion is emphasized). In such a case, it is preferable to use the monochromatic G $PSF_G(x,y)$ to generate the restoration filter such that the frequency emphasis does not occur in the tangential direction.

Specifically, the case where the degree of the MTF degradation is small in the tangential direction refers to a case where a condition expressed by [Formula 9] below is satisfied.

$$\frac{MTF_y(\omega_x, \omega_y)}{MTF_y(\omega_x, \omega_y)^2 + P_N(\omega_x, \omega_y)/P_X(\omega_x, \omega_y)} > 1 \quad \text{[Formula 9]}$$

The case where the degree of the MTF degradation is small in the tangential direction may be stated in another way, that is, a case where a magnitude of the frequency emphasis by way of the Wiener filter exceeds 1.0 at low and middle frequencies in the tangential direction by mixing the PSF or the MTF.

Where $(\omega_x, \omega_y)$ is equal to or less than 0.25 Fs (Fs: sampling frequency) which is visually important. In this way, in a state of the magnification chromatic aberration correction OFF with the chromatic aberration being distinct, the monochromatic G $PSF_G(x,y)$ is used to generate the restoration filter. This can prevent a frequency in a direction where the chromatic aberration is distinct from being emphasized adversely by the restoration filter generated using the $PSF_Y$ which is obtained by mixing the $PSF_R$, $PSF_G$, and $PSF_B$ for the respective colors of RGB. The reason why the G $PSF_G(x,y)$ is used is because the G image data of RGB contributes the most to generation of the luminance system image data.

In this embodiment, the data formats for the $PSF_R$, $PSF_G$, and $PSF_B$ include the data arranged such that the PSF gravity center is at the center (coordinates of x=0 and y=0) and the data $\alpha_R(r)$, $\alpha_G(r)$, and $\alpha_B(r)$ representing of the gravity center positions of the $PSF_R$, $PSF_G$, and $PSF_B$ as shown in FIG. 6A, but the invention is not limited thereto. For example, even if the $PSF_R$, $PSF_G$, and $PSF_B$ each of which has an absolute position are used, various transfer functions can be similarly calculated. Since the PSF and the OTF are in relation of the Fourier transform, the OTF may be used in place of the PSF in the above embodiments, and since the OTF has an amount of the information equivalent to the combination of the MTF and the PTF, the MTF and the PTF may be used.

<Application Example to EDoF System>

The restoration process in the above embodiments is an image processing in which a point spread (point image blur) is recovered and corrected depending on a certain imaging condition (e.g., aperture value, F-number, focal length, kind of lens, etc.) to restore an original subject image, but an image restoration process to which the invention is applicable is not limited to the restoration process in the above embodiments. For example, the restoration process according to the invention can be applied also to the restoration process performed on the image data which is imaged and obtained by an optical system (imaging lens or the like) having an extended depth of field (focus)) (EDoF). Performing the restoration process on the image data of a blurred image which is imaged and obtained by an EDoF optical system with the depth of field (depth of focus) being extended makes it possible to restore and generate high resolution image data that is in focus in a wide range. In this case, the restoration process is performed using the restoration filter on the basis of the point spread function of the EDoF optical system (PSF, OTF, MTF, PTF, etc.), the restoration filter having a filter coefficient set so that the good image restoration can be made in a range of the extended depth of field (depth of focus).

Hereinafter, a description is given of an example of a system (EDoF system) relating to restoration of the image data that is imaged and obtained through the EDoF optical system.

Figure 13:
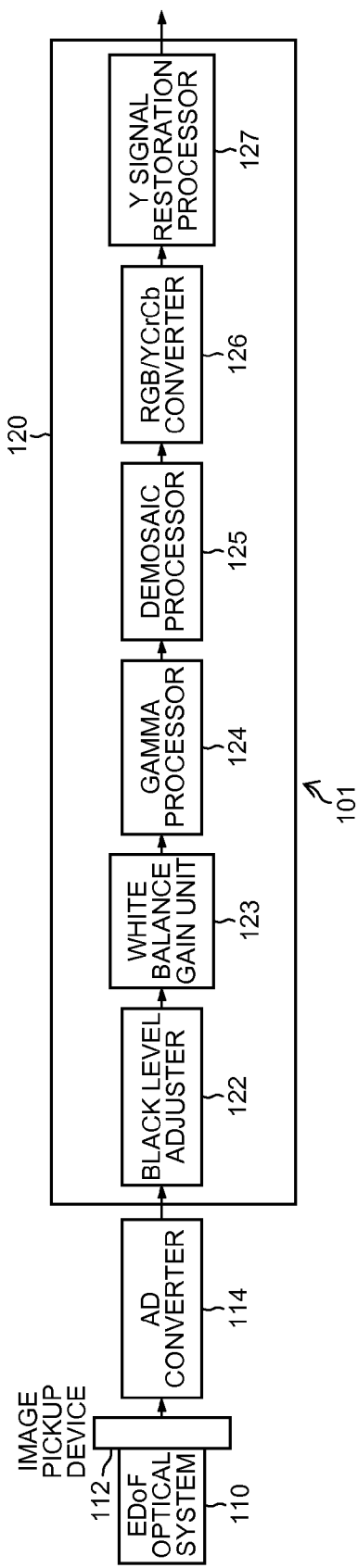
FIG. 13 is a block diagram showing a form of an image pickup module including an EDoF optical system.

FIG. 13 is a block diagram showing a form of an image pickup module 101 including the EDoF optical system. The image pickup module (digital camera, etc.) 101 in this example includes an EDoF optical system (lens unit) 110, an image pickup device 212, AD converter 114, restoration process block (image processor) 120.

Figure 14:
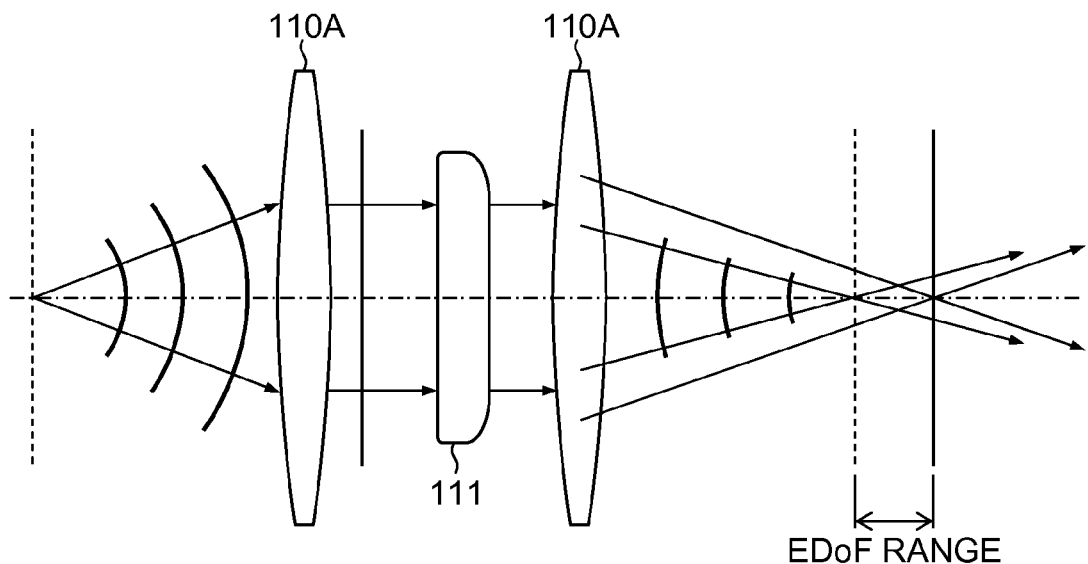
FIG. 14 is a diagram showing an example of the EDoF optical system.

FIG. 14 is an illustration showing an example of the EDoF optical system 110. The EDoF optical system 110 in this example has a single focus fixed imaging lens 110A and an optical filter 111 located at a pupil position. The optical filter 111 which modulates a phase constitutes the EDoF optical system 110 (imaging lens 110A) so as to obtain the extended depth of field (depth of focus) (EDoF) (that is, the EDoF optical system 110 is extended in depth of field). In this way, the imaging lens 110A and the optical filter 111 constitute a lens section which modulates the phase to extend the depth of field.

The EDoF optical system 110 includes other components as needed, and for example, a diaphragm (omitted in the figure) is disposed near the optical filter 111. The number of the optical filter 111 may be one, or a combination of plural optical filters may be used. The optical filter 111 is only an example of an optical phase modulation device, and the EDoF optical system 110 (imaging lens 110A) may be extended in depth of field by another device. For example, instead of disposing the optical filter 111, an imaging lens 110A whose lens is designed to have a functionality equivalent to that of the optical filter 111 of this example may achieve the extending in depth of field of the EDoF optical system 110, and various optical wavefront modulation elements may be employed.

Specifically, the extending in depth of field of the EDoF optical system 110 can be achieved by use of various devices for changing a wavefront of an image formed on the light receiving surface of the image pickup device 112. For example, as the device for extending in depth of field of the EDoF optical system 110, there may be used an "optical element whose thickness is variable", "optical element whose refractive index is variable (gradient index wavefront modulation lens, etc.)", "optical element whose thickness or refractive index is variable due to coding to the lens surface (wavefront modulation hybrid lens, optical element formed as a phase plane on the lens surface, etc.)", and "liquid crystal element whose light phase distribution is modulatory (liquid crystal spatial phase modulation element, etc.)". In this way, the invention is applicable not only to a case where an image can be formed with being regularly distributed by use of the optical wavefront modulation element (optical filter 111 (phase plate)) but also to a case where an image with distribution similar to that obtained using the optical wavefront modulation element can be formed using the imaging lens 110A itself without using the optical wavefront modulation element.

The EDoF optical system 110 shown in FIG. 14 in which a focusing mechanism for mechanical focusing can be omitted may be reduced in size, and therefore, can be preferably mounted on a camera phone or a personal digital assistance.

The optical image after passing through the EDoF optical system 110 having been extended in depth of field is formed into an image on the image pickup device 112 shown in FIG. 13 and converted into an electric signal in the device 112.

The image pickup device 112 is constituted by plural pixels arranged in a matrix in a predetermine pattern array (Bayer array, G-striped R/B-fully-checkered array, X-Trans (registered trademark) array, honeycomb array, etc.) and each pixel is configured to include a microlens, color filter (RGB color filter in the example) and photodiode. The optical image through the EDoF optical system 110 incident on the light receiving surface of the image pickup device 112 is converted into a signal electrical charge of an amount corresponding to an amount of its incident light by the photodiodes arranged on the light receiving surface. Then, the signal electrical charge of R, G, or B accumulated in each of the photodiodes is serially output as a voltage signal (image signal) for each pixel.

The AD converter 114 converts analog R, G, and B image signals output for the respective pixels from the image pickup device 112 into digital RGB image signals. A digital image signal obtained through digital image signal conversion by the AD converter 114 is added to the restoration process block 120.

The restoration process block 120 includes, for example, a black level adjuster 122, white balance gain unit 123, gamma processor 124, demosaic processor 125, RGB/YC converter 126, and restoration processor (Y signal restoration processor) 127.

The black level adjuster 122 subjects the digital image signal output from the AD converter 114 to black level adjustment. The black level adjustment may be made by using a well-known method. For example, the black level adjustment is performed, with attention being put on a certain effective photoelectric conversion element, by finding an average of signals for acquiring dark current amount respectively corresponding to plural OB (optical black) photoelectric conversion elements included in a row of photoelectric conversion element containing the relevant effective photoelectric conversion element, and subtracting the average from the signal for acquiring dark current amount corresponding to the relevant effective photoelectric conversion element.

The white balance gain unit 123 performs gain adjustment depending on a white balance gain of each color signal of RGB included in the digital image signal having black level data adjusted.

The gamma processor 124 performs gamma correction for tone correction of halftone or the like so that each of the R, G, and B image signals having the white balance adjusted has desired gamma characteristics.

The demosaic processor 125 performs the demosaic process on the R, G, and B image signals after subjected to the gamma correction. Specifically, the demosaic processor 125 subjects the R, G, and B image signals to a color interpolation process to generate a set of image signals (R signal, G signal, B signal) output from light receiving pixels in the image pickup device 112. That is to say, the pixel signal from each of the light receiving pixels before a color demosaic process is any of the R, G, and B image signals, but a set of three pixel signals of R, G, and B signals respectively corresponding to the light receiving pixels is output after the color demosaic process.

The RGB/YC converter 126 converts the R, G, and B signals for the respective pixels after subjected to the demosaic process into the luminance signal Y and color-difference signals Cr and Cb to output the luminance signal Y and the color-difference signals Cr and Cb for the respective pixels.

The restoration processor 127 performs the restoration process on the luminance signal Y from the RGB/YC converter 126 on the basis of the restoration filter stored in advance. The restoration filter includes a deconvolution kernel having a kernel size of 7×7 (corresponding to the number of taps, M=7, N=7), for example, and an operation coefficient corresponding to the deconvolution kernel (corresponding to restoration gain data, filter coefficient) and is used for the deconvolution process (deconvolution operation process) by an amount of phase modulation by the optical filter 111. The restoration filter corresponding to the optical filter 111 is stored in a memory which is not shown in the figure (e.g., memory accompanied by the restoration processor 127). The kernel size of the deconvolution kernel is not limited to 7×7.

Figure 15:
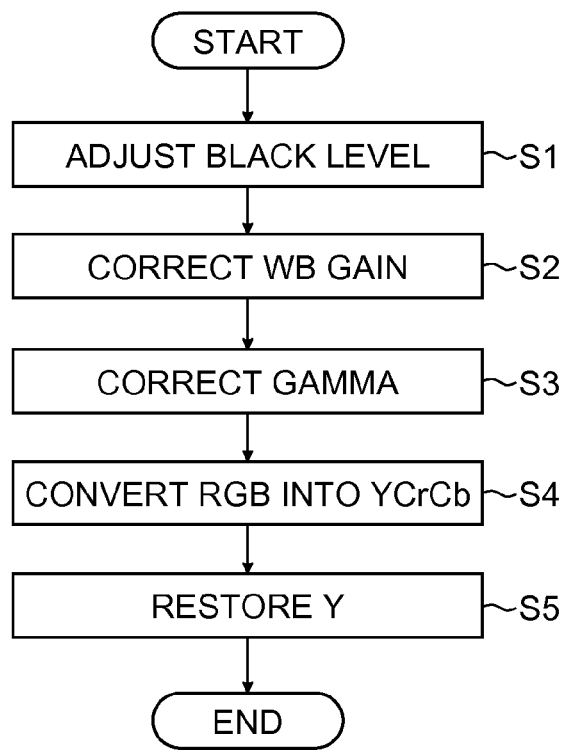
FIG. 15 is a flowchart showing a flow of the restoration process by a restoration processor constituting the image pickup module.

Next, a description is given of the restoration process by the restoration process block 120. FIG. 15 is a flowchart showing an example of the restoration process in the restoration process block 120 shown in FIG. 13.

The digital image signal is input from the AD converter 114 to one of inputs of the black level adjuster 122 and the black level data is input to the other of the inputs. The black level adjuster 122 subtracts the black level data from the digital image signal and outputs the digital image signal from which the black level data has been subtracted to the white balance gain unit 123 (step S1). By doing so, the digital image signal does not include a black level component, and thus, the digital image signal indicating the black level is "0".

The image data after the black level adjustment is processed by the white balance gain unit 123 and the gamma processor 124 in this order (step S2 and S3).

The R, G, and B signals having been subjected to the gamma correction are subjected to the demosaic process by the demosaic processor 125, and thereafter, converted into the luminance signal Y and the color-difference signals (chrominance signals) Cr and Cb in the RGB/YC converter 126 (step S4).

The restoration processor 127 performs on the luminance signal Y the restoration process for performing the deconvolution process by an amount of phase modulation by the optical filter 111 in the EDoF optical system 110 (step S5). Specifically, the restoration processor 127 performs the deconvolution process (deconvolution operation process) of the luminance signal (here, luminance signal of 7×7 pixels) corresponding to a pixel group in units of predetermined pixels the center of which group is any pixel as a target to be processed, and the restoration filter stored in the memory or the like in advance (deconvolution kernel of 7×7 and its operation coefficient). The restoration processor 127 performs the restoration process by repeating the deconvolution process for each pixel group in units of predetermined pixels so as to cover all over the area of an image pickup surface to eliminate an image blur across the image.

The point image (optical image) of the luminance signal after passing through the EDoF optical system 110 is formed into an image as a large point image (blurred image) on the image pickup device 112, but is restored into a small point image (high resolution image) through the deconvolution process by the restoration processor 127.

As described above, performing of the restoration process on the luminance signal after the demosaic process can eliminate necessity of holding parameters of the restoration process separately for RGB, and speed up the restoration process. As for the color-difference signals Cr and Cb, in terms of human eyes characteristics, even if the resolution is not improved by the restoration process, the quality of image is allowable. In a case where the image is recorded in a compression format such as JPEG (Joint Photographic Experts Group), since the color-difference signal is compressed at a compression ratio higher than the luminance signal, there is little necessity to improve the resolution by the restoration process. In this way, both restoration accuracy improvement and process simplification, and speeding-up can be attained.

The restoration filter according to the first to fifth embodiments of the invention can be generated also for the restoration process in the EDoF system as described above.

As an aspect to which the invention is applicable is not limited to the digital camera 2 and the restoration filter generation device 11, but applicable also to, besides the cameras capturing an image as a main functionality, mobile devices having other functionalities than image capturing (telephoning functionality, communication functionality, other computer functionalities) as well as the image capturing functionality. Examples of another aspect to which the invention is applicable include a mobile phone having a camera functionality or smartphone, PDA (Personal Digital Assistants), and portable game console, for example. Hereinafter, a description is given of an example of the smartphone to which the invention is applicable.

<Configuration of Smartphone>

Figure 16:
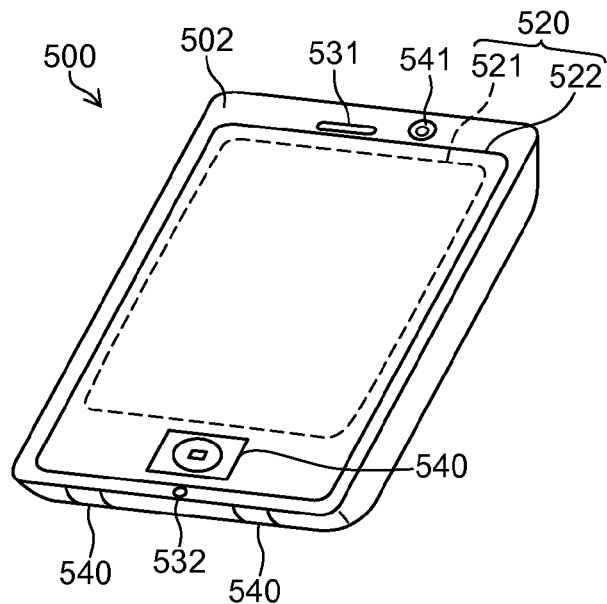
FIG. 16 is a perspective view showing an outer appearance of a smartphone.

FIG. 16 is a perspective view showing an outer appearance of a smartphone 500 as another embodiment of the digital camera 2. The smartphone 500 shown in FIG. 16 having a housing 502 shaped in a flat plate includes on one face of the housing 502 a display and input unit 520 in which a display panel 521 as a display unit and an operation panel 522 as an input unit are integrated. The housing 502 includes a speaker 531, microphone 532, operation unit 540, and camera unit 541. A configuration of the housing 502 is not limited thereto. For example, a configuration in which the display unit and the input unit are independent of each other or a configuration in which the housing 502 itself has a clamshell structure or a slide mechanism may also be used.

Figure 17:
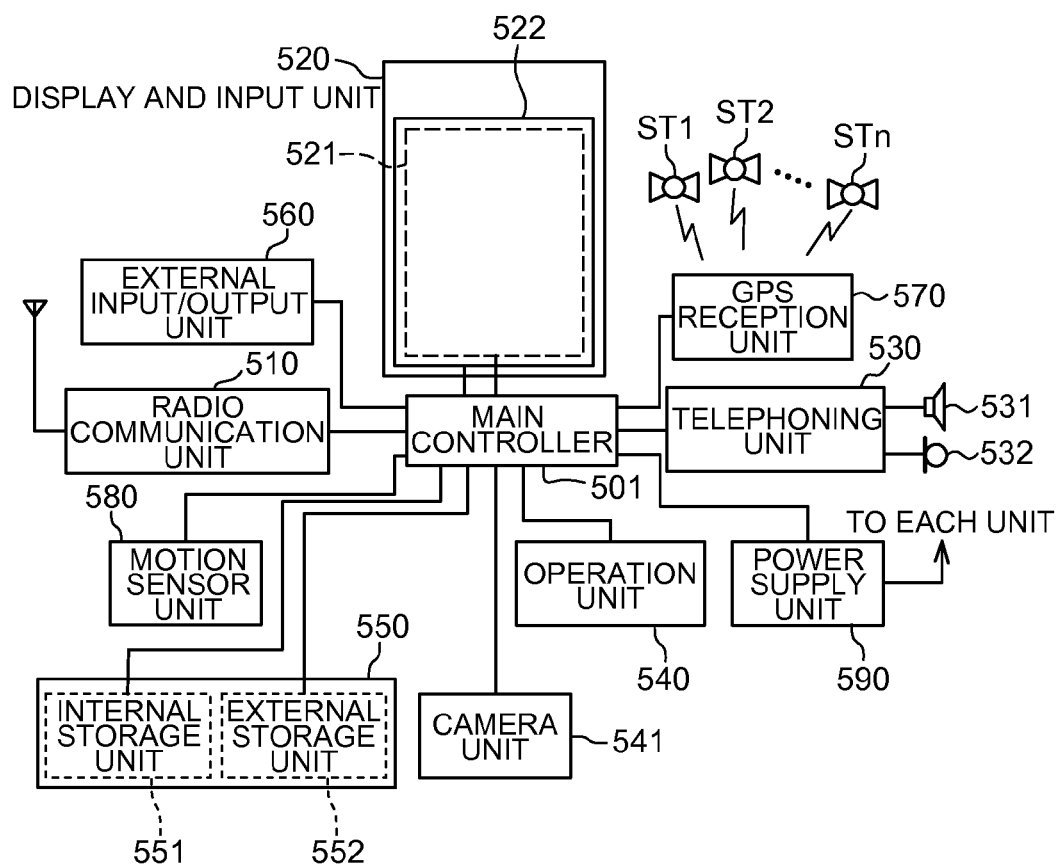
FIG. 17 a block diagram showing a configuration of the smartphone.

FIG. 17 is a block diagram showing the configuration of the smartphone 500 shown in FIG. 16. As shown in FIG. 17, included are as main components of the smartphone a radio communication unit 510, display and input unit 520, telephoning unit 530, operation unit 540, camera unit 541, storage unit 550, external input/output unit 560, GPS (Global Positioning System) reception unit 570, motion sensor unit 580, power supply unit 590, and main controller 501. As a main function of the smartphone 500, a radio communication function for carrying out mobile radio communication with a base station device BS via a mobile communication network NW is included.

The radio communication unit 510 carries out radio communication with the base station device BS included in the mobile communication network NW according to an instruction from the main controller 501. This radio communication is used to transmit and receive various pieces of file data such as audio data, image data and the like, and e-mail data and the like and receive Web data, streaming data and the like.

The display and input unit 520 is a so-called touch panel which, by way of control by the main controller 501, displays an image (still image and moving image) and text information to visually deliver information to the user, as well as detects a user's operation on the displayed information. The display and input unit 520 includes the display panel 521 and the operation panel 522. It is preferable that the display panel 521 is a 3D display panel in a case of viewing a generated 3D image.

The display panel 521 uses an LCD (Liquid Crystal Display), an OELD (Organic Electro-Luminescence Display) and the like as a display device.

The operation panel 522, which is placed such that an image displayed on a display surface of the display panel 521 can be visually recognized, is a device for detecting one or more coordinates operated by a user's finger or a stylus. If this device is operated by a user's finger or a stylus, a detection signal generated due to the operation is output to the main controller 501. Subsequently, the main controller 501 detects an operated position (coordinates) on the display panel 521 on the basis of the received detection signal.

As shown in FIG. 16, the display panel 521 and operation panel 522 in the smartphone 500 are integrated to constitute the display and input unit 520, and the operation panel 522 is arranged in a manner to fully cover the display panel 521. In a case of using such an arrangement, the operation panel 522 may have a function to detect the user's operation on also an area outside the display panel 521. In other words, the operation panel 522 may have a detection area for an overlapping portion overlapped with the display panel 521 (hereinafter, referred to as a displayed area) and a detection area for a peripheral portion not overlapped with the display panel 521 other than the overlapping portion (hereinafter, referred to as a non-displayed area).

Note that a size of the displayed area and a size of the display panel 521 may completely match each other, but both sizes may not necessarily match. The operation panel 522 may have two sensitive areas of the peripheral portion and an inside portion other than that. Further, a width of the peripheral portion is appropriately designed depending on a size of the housing 502 and the like. A position detection method used for the operation panel 522 includes a matrix switch method, resistance film method, surface acoustic wave method, infrared ray method, electromagnetic induction method, electrostatic capacitance method and the like, any method of which may be used.

The telephoning unit 530 having the speaker 531 and the microphone 532 converts user voice input through the microphone 532 into the audio data processable by the main controller 501 to output to the main controller 501, and decodes the audio data received by the radio communication unit 510 or the external input/output unit 560 to output from the speaker 531. As shown in FIG. 16, for example, the speaker 531 may be mounted on the same side as the display and input unit 520 is disposed, and the microphone 532 may be mounted on a lateral side of the housing 502.

The operation unit 540 which is a hardware key using a key switch and the like accepts an instruction from the user. For example, the operation unit 540 is mounted on a lower lateral side at a lower part of the display unit of the housing 502 of the smartphone 500. The operation unit 540 is, for example, a press-button type switch which is turned on when pressed down by a finger or the like and is brought into a turned-off state by a restoring force of a spring or the like when the finger is released.

The storage unit 550 stores a control program and control data for the main controller 501, the restoration filter according to the invention, address data having a name, telephone number and the like of the communication other end associated with each other, data of transmitted and received e-mail, Web data downloaded by way of Web browsing, and downloaded content data, and transiently stores streaming data or the like. The storage unit 550 includes an internal storage unit 551 built in the smartphone and an external storage unit 552 having a detachable external memory slot. Each of the internal storage unit 551 and the external storage unit 552 included in the storage unit 550 is attained by use of a storage medium such as a flash memory type, hard disk type, multimedia card micro type, card type memory (e.g., Micro SD ((registered trademark) memory, etc.), RAM (Random Access Memory), and ROM (Read Only Memory).

The external input/output unit 560 serves as an interface with all external devices coupled to the smartphone 500 to allow other external devices to be directly or indirectly connected via a communication or the like (e.g., USB (Universal Serial Bus), IEEE1394, etc.) or network (e.g., Internet, wireless LAN (Local Area Network), Bluetooth (registered trademark), RFID (Radio Frequency Identification), IrDA (Infrared Data Association) (registered trademark), UWB (Ultra Wideband) (registered trademark), Zig-Bee (registered trademark), etc.).

Examples of the external device coupled to the smartphone 500 include, for example, a wired/wireless head set, wired/wireless external charger, wired/wireless data port, memory card or SIM (Subscriber Identity Module Card)/UIM (User Identity Module Card) card connected via a card socket, external audio and video device connected via an audio and video I/O (Input/Output) terminal, external audio and video device wirelessly connected, smartphone via a wired/wireless connection, personal computer via a wired/wireless connection, PDA via a wired/wireless connection, personal computer via a wired/wireless connection, earphone, and the like. The external input/output unit can deliver data received by way of transmission from such an external device above to the respective components in the smartphone 500 and transmit the data in the smartphone 500 to the external devices.

The GPS reception unit 570 receives GPS signals transmitted from GPS satellites ST1 to STn to perform positioning arithmetic process on the basis of the received plural GPS signals according to an instruction from the main controller 501, and detects a position including latitude, longitude, and altitude of the smartphone 500. When positional information can be acquired from the radio communication unit 510 or the external input/output unit 560 (e.g., wireless LAN), the GPS reception unit 570 may use the positional information to detect the position.

The motion sensor unit 580 which includes, for example, a triaxial acceleration sensor or the like detects physical motion of the smartphone 500 according to an instruction from the main controller 501. Detection of the physical motion of the smartphone 500 allows a direction or acceleration of motion of the smartphone 500 to be detected. This detection result is to be output to the main controller 501.

The power supply unit 590 supplies electrical power stored in a battery (not shown) to each unit of the smartphone 500 according to an instruction from the main controller 501.

The main controller 501 which includes a microprocessor operates according to the control program or control data stored in the storage unit 550 and collectively controls the respective units of the smartphone 500. The main controller 501 has a mobile communication controlling function to control each unit in a communication system and an application processing function in order to perform audio communication or data communication via the radio communication unit 510.

The application processing function is attained by the main controller 501 operating according to the application software stored in the storage unit 550. Examples of the application processing function include, for example, an infrared communication function to control the external input/output unit 560 to perform the data communication with an opposite device, e-mail function to transmit and receive an e-mail, Web browsing function to view a Web page, and the like.

The main controller 501 has an image processing function to display a video on the display and input unit 520 and so forth on the basis of the image data such as the received data or the downloaded streaming data (data of still image and moving image). The image processing function refers to a function that the main controller 501 decodes the above image data and subjects this decoding result to the image processing to display the image on the display and input unit 520.

Further, the main controller 501 performs display control of the display panel 521 and operation detecting control to detect the user's operation via the operation unit 540 and the operation panel 522.

The main controller 501 performs the display control to display an icon for starting the application software or a software key such as a scroll bar, or display a window for creating an e-mail. Note that the scroll bar refers to a software key for accepting an instruction to move a displayed portion of an image such as a large image not entirely accommodated within a displayed area of the display panel 521.

The main controller 501 performs the operation detecting control to detect the user's operation input via the operation unit 540, accepts via the operation panel 522 an operation on the above icon or input of a character string to an input field in the above window, or accepts a request input via the scroll bar for scrolling of the displayed image.

Further, the main controller 501 has a touch panel controlling function to perform the operation detecting control to determine whether an operated position on the operation panel 522 is the overlapping portion (displayed area) overlapped with the display panel 521 or the peripheral portion (non-displayed area) not overlapped with the display panel 521 other than the overlapping portion, and control a sensitive area of the operation panel 522 or a displayed position of the software key.

The main controller 501 can also detect a gesture operation on the operation panel 522 and perform a function set in advance in response to the detected gesture operation. The gesture operation means not a simple touch operation of related art, but an operation including tracking by a finger or the like, simultaneously specifying a plurality of positions, or combining these operations to track from at least one of a plurality of positions.

The camera unit 541 is a digital camera electronically imaging by use of the image pickup device such as a CMOS (Complementary Metal Oxide Semiconductor) or a CCD (Charge-Coupled Device). The above described digital camera 2 can be applied to this camera unit 541.

The camera unit 541 can, under the control of the main controller 501, convert the image data obtained by capturing an image into a compressed image data such as JPEG (Joint Photographic coding Experts Group), for example, to store in the storage unit 550 and output via the external input/output unit 560 or the radio communication unit 510. In the smartphone 500 shown in FIG. 16, the camera unit 541 is mounted on the same side as the display and input unit 520, but, a mounted position of the camera unit 541 being not limited thereto, may be mounted on a back side of the display and input unit 520, or a plurality of camera units 541 may be mounted for example. In the case where a plurality of camera units 541 are mounted, the camera unit 541 for imaging may be changed over for singularly imaging, or a plurality of camera units 541 may be simultaneously used for imaging.

The camera unit 541 can be used for the various functions of the smartphone 500. For example, an image obtained by the camera unit 541 may be displayed on the display panel 521, or an image of the camera unit 541 may be used as one of operation input on the operation panel 522. When the GPS reception unit 570 detects a position, the position can be detected by referring an image from the camera unit 541. Further, by referring an image from the camera unit 541, without using the triaxial acceleration sensor or in combination with the triaxial acceleration sensor, an optical axis direction of the camera unit 541 of the smartphone 500 can be determined, and also a current usage environment can be determined. Of course, an image from the camera unit 541 may be used in the application software.

OTHERS

The digital camera 2 in this embodiment has the memory 14 in the camera in which the restoration filter generated by the restoration filter generation device 11 is stored via the communication I/F 44 in the restoration filter generation device 11, but the digital camera 2 and the restoration filter generation device 11 may be integrated. In this case, the digital camera also generates the restoration filter and uses the generated restoration filter to perform the restoration process. The digital camera may b e an interchangeable lens type, in which the PSF and the like of a mounted interchange lens may be acquired via communication with the interchange lens and the restoration filter may be generated on the basis of the acquired PSF and the like.

Further, the invention includes a restoration filter generation program which is installed in a general-purpose personal computer to cause the personal computer to function as the restoration filter generation device, and a (non-transitory and computer-readable) recording medium in which this restoration filter generation program is recorded. The restoration filter generation program causes the computer to attain at least functions corresponding to the first transfer function acquisition device, correction information acquisition device, second transfer function acquisition device, third transfer function calculation device, and restoration filter generation device of the restoration filter generation device.

It goes without saying that the present invention is not limited to the embodiments described above and may be variously modified in the scope without departing from the spirit of the invention.

What is claimed is:

1. A restoration filter generation device that generates a restoration filter for a restoration process on the basis of a point spread in an optical system, the restoration process being performed on luminance system image data as image data concerning a luminance which is generated on the basis of image data for each color of plural colors acquired by an image pickup device having the optical system, the restoration filter generation device comprising:
   a first transfer function acquisition device that acquires a first transfer function regarding the point spread in the optical system for each color of the plural colors;
   a correction information acquisition device that, in a case where magnification chromatic aberration caused by the optical system is corrected by scaling up or down the image data for each color of the plural colors, acquires correction information indicating a correction amount or a correction residual amount of the magnification chromatic aberration, for each color of the plural colors;
   a second transfer function acquisition device that acquires a second transfer function obtained by parallelly translating the first transfer function for each color of the plural colors so as to offset the correction residual amount on the basis of the correction information acquired by the correction information acquisition device;
   a third transfer function calculation device that calculates a third transfer function with respect to the luminance system image data by mixing the second transfer functions for respective colors of the plural colors acquired by the second transfer function acquisition device; and
   a restoration filter generation device that generates the restoration filter for the restoration process on the basis of the third transfer function calculated by the third transfer function calculation device.

2. The restoration filter generation device according to claim 1, wherein the third transfer function calculation device mixes the second transfer functions for respective colors of the plural colors to calculate the third transfer function with respect to the luminance system image data.

3. The restoration filter generation device according to claim 2, wherein the third transfer function calculation device calculates a linear sum of values obtained by multiplying the second transfer functions for respective colors of the plural colors by weighting coefficients for respective colors as the third transfer function with respect to the luminance system image data.

4. The restoration filter generation device according to claim 1, further comprising:
   a correction accuracy evaluation device that evaluates whether or not correction accuracy of the magnification chromatic aberration is equal to or less than a threshold, wherein
   in a case where the correction accuracy evaluation device evaluates that the correction accuracy of the magnification chromatic aberration is equal to or less than the threshold, the restoration filter generation device removes phase information from the third transfer function calculated by the third transfer function calculation device to generate the restoration filter for performing only frequency restoration on the basis of the third transfer function from which the phase information is removed.

5. The restoration filter generation device according to claim 1, further comprising:
   a fourth transfer function calculation device that removes phase information respectively from the first transfer functions for respective colors of the plural colors acquired by the first transfer function acquisition device and mixes the first transfer functions for respective colors of the plural colors from each of which the phase information is removed to calculate a fourth transfer function with respect to the luminance system image data; and
   a correction accuracy evaluation device that evaluates whether or not correction accuracy of the magnification chromatic aberration is equal to or less than a threshold, wherein
   in a case where the correction accuracy evaluation device evaluates that the correction accuracy of the magnification chromatic aberration is equal to or less than the threshold, the restoration filter generation device generates the restoration filter for performing only frequency restoration with respect to the luminance system image data on the basis of the fourth transfer function calculated by the fourth transfer function calculation device.

6. The restoration filter generation device according to claim 5, wherein the fourth transfer function calculation device calculates a square root of a sum of squares of values obtained by multiplying the first transfer functions for respective colors of the plural colors from each of which the phase information is removed by weighting coefficients for respective colors as the fourth transfer function with respect to the luminance system image data.

7. The restoration filter generation device according to claim 5, wherein the fourth transfer function calculation device calculates a linear sum of values obtained by multiplying the first transfer functions for respective colors of the plural colors from each of which the phase information is removed by weighting coefficients for respective colors as the fourth transfer function with respect to the luminance system image data.

8. The restoration filter generation device according to claim 1, wherein the first transfer function acquisition device acquires the first transfer function for each color of the plural colors for the optical system which has a lens section for modulating a phase to extend a depth of field.

9. The restoration filter generation device according to claim 1, further comprising:
a switching device that switches over between a case where magnification chromatic aberration correction is performed and a case where the magnification chromatic aberration correction is not performed; and
a fifth transfer function calculation device that mixes the first transfer functions for respective colors of the plural colors to calculate a fifth transfer function with respect to the luminance system image data when the switching device switches over to the case where the magnification chromatic aberration correction is not performed, wherein
the restoration filter generation device generates the restoration filter with respect to the luminance system image data on the basis of the fifth transfer function calculated by the fifth transfer function calculation device when the switching device switches over to the case where the magnification chromatic aberration correction is not performed.

10. The restoration filter generation device according to claim 1, further comprising:
a switching device that switches over between a case where the magnification chromatic aberration correction is performed and a case where the magnification chromatic aberration correction is not performed, wherein
the image data of the plural colors includes image data of each color of red (R), green (G), and blue (B), and
the restoration filter generation device generates the restoration filter with respect to the luminance system image data on the basis of the first transfer function corresponding to the G color of the first transfer functions for respective colors of the plural colors which are acquired by the first transfer function acquisition device, when the switching device switches over to the case where the magnification chromatic aberration correction is not performed.

11. An image processing device comprising:
an image data acquisition device that acquires image data for each color of plural colors acquired by an image pickup device having an optical system;
a magnification chromatic aberration correction device that corrects magnification chromatic aberration for each color caused by the optical system by scaling up or down the image data for each color of the plural colors acquired by the image data acquisition device;
an image data generation device that generates luminance system image data as image data concerning a luminance on the basis of the image data for each color of the plural colors subjected to the magnification chromatic aberration correction by the magnification chromatic aberration correction device;
a restoration filter storage device that stores therein a restoration filter generated by the restoration filter generation device according to claim 1; and
a restoration process device that performs a restoration process on the luminance system image data generated by the image data generation device by use of the restoration filter stored in the restoration filter storage device.

12. An image processing device comprising:
an image data acquisition device that acquires image data for each color of plural colors acquired by an image pickup device having an optical system;
a switching device that switches over between a case where magnification chromatic aberration correction is performed and a case where the magnification chromatic aberration correction is not performed;
a magnification chromatic aberration correction device that corrects magnification chromatic aberration for each color caused by the optical system by scaling up or down the image data for each color of the plural colors acquired by the image data acquisition device, when the switching device switches over to the case where the magnification chromatic aberration correction is performed;
an image data generation device that generates luminance system image data as image data concerning a luminance on the basis of the image data for each color of the plural colors subjected to the magnification chromatic aberration correction by the magnification chromatic aberration correction device, when the switching device switches over to the case where the magnification chromatic aberration correction is performed, and generates luminance system image data as image data concerning a luminance on the basis of the image data for each color of the plural colors acquired by the image data acquisition device, when the switching device switches over to the case where the magnification chromatic aberration correction is not performed;
a restoration filter storage device that stores therein a restoration filter generated by the restoration filter generation device according to claim 9; and
a restoration process device that performs a restoration process on the luminance system image data generated by the image data generation device by use of the restoration filter stored in the restoration filter storage device.

13. An image processing device comprising:
an image data acquisition device that acquires image data for each color of plural colors acquired by an image pickup device having an optical system;
a magnification chromatic aberration correction device that corrects magnification chromatic aberration for each color caused by the optical system by scaling up or down the image data for each color of the plural colors acquired by the image data acquisition device;

an image data generation device that generates luminance system image data as image data concerning a luminance on the basis of the image data for each color of the plural colors subjected to magnification chromatic aberration correction by the magnification chromatic aberration correction device;

the restoration filter generation device according to claim 1; and a restoration process device that performs a restoration process on the luminance system image data generated by the image data generation device by use of the restoration filter generated by the restoration filter generation device.

14. An image processing device comprising:

an image data acquisition device that acquires image data for each color of plural colors acquired by an image pickup device having an optical system;

a switching device that switches over between a case where magnification chromatic aberration correction is performed and a case where the magnification chromatic aberration correction is not performed;

a magnification chromatic aberration correction device that corrects magnification chromatic aberration for each color caused by the optical system by scaling up or down the image data for each color of the plural colors acquired by the image data acquisition device, when the switching device switches over to the case where the magnification chromatic aberration correction is performed;

an image data generation device that generates luminance system image data as image data concerning a luminance on the basis of the image data for each color of the plural colors subjected to the magnification chromatic aberration correction by the magnification chromatic aberration correction device, when the switching device switches over to the case where the magnification chromatic aberration correction is performed, and generates luminance system image data as image data concerning a luminance on the basis of the image data for each color of the plural colors acquired by the image data acquisition device, when the switching device switches over to the case where the magnification chromatic aberration correction is not performed;

the restoration filter generation device according to claim 9; and a restoration process device that performs a restoration process on the luminance system image data generated by the image data generation device by use of the restoration filter generated by the restoration filter generation device.

15. An imaging device comprising:

an image pickup device that has an optical system and outputs image data for each color of plural colors; and an image processing device according to claim 11.

16. A restoration filter generation method for generating a restoration filter for a restoration process on the basis of a point spread in an optical system, the restoration process being performed on luminance system image data as image data concerning a luminance which is generated on the basis of image data for each color of plural colors acquired by an image pickup device having the optical system, the method comprising:

a first transfer function acquisition step of acquiring a first transfer function regarding the point spread in the optical system for each color of the plural colors;

a correction information acquisition step of, in a case where magnification chromatic aberration caused by the optical system is corrected by scaling up or down the image data for each color of the plural colors, acquiring correction information indicating a correction amount or a correction residual amount of the magnification chromatic aberration, for each color of the plural colors;

a second transfer function acquisition step of acquiring a second transfer function obtained by parallelly translating the first transfer function for each color of the plural colors so as to offset the correction residual amount on the basis of the correction information acquired in the correction information acquisition step;

a third transfer function calculation step of calculating a third transfer function with respect to the luminance system image data by mixing the second transfer functions for respective colors of the plural colors acquired in the second transfer function acquisition step; and a restoration filter generation step of generating the restoration filter for the restoration process on the basis of the third transfer function calculated in the third transfer function calculation step.

17. A non-transitory computer-readable medium recording a program that generates a restoration filter for a restoration process on the basis of a point spread in an optical system, the restoration process being performed on luminance system image data as image data concerning a luminance which is generated on the basis of image data for each color of plural colors acquired by an image pickup device having the optical system, the program causing a computer to execute:

a first transfer function acquisition step of acquiring a first transfer function regarding the point spread in the optical system for each color of the plural colors;

a correction information acquisition step of, in a case where magnification chromatic aberration caused by the optical system is corrected by scaling up or down the image data for each color of the plural colors, acquiring correction information indicating a correction amount or a correction residual amount of the magnification chromatic aberration, for each color of the plural colors;

a second transfer function acquisition step of acquiring a second transfer function obtained by parallelly translating the first transfer function for each color of the plural colors so as to offset the correction residual amount on the basis of the correction information acquired in the correction information acquisition step;

a third transfer function calculation step of calculating a third transfer function with respect to the luminance system image data by mixing the second transfer functions for respective colors of the plural colors acquired in the second transfer function acquisition step; and a restoration filter generation step of generating the restoration filter for the restoration process on the basis of the third transfer function calculated in the third transfer function calculation step.

\* \* \* \* \*